US008479511B2

(12) United States Patent
Pursifull et al.

(10) Patent No.: US 8,479,511 B2
(45) Date of Patent: *Jul. 9, 2013

(54) METHOD AND SYSTEM FOR A TURBOCHARGED ENGINE

(75) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,377

(22) Filed: Jul. 13, 2011

(65) Prior Publication Data

US 2012/0023935 A1    Feb. 2, 2012

Related U.S. Application Data

(63) Continuation-in-part of application No. 12/878,838, filed on Sep. 9, 2010, now Pat. No. 8,069,663.

(51) Int. Cl.
*F02B 33/44* (2006.01)
*F02B 15/00* (2006.01)
*F02M 25/07* (2006.01)
*F01L 1/34* (2006.01)

(52) U.S. Cl.
USPC ...... 60/605.2; 60/605.1; 123/432; 123/90.15; 123/90.16

(58) Field of Classification Search
USPC ............. 60/605.2, 605.1, 600, 602; 701/108; 123/90.15, 568.12, 560, 432, 559.1, 559.3
IPC ...................................................... F02M 25/07
See application file for complete search history.

(56) References Cited

U.S. PATENT DOCUMENTS

| 3,964,451 | A | * | 6/1976 | Goto .............................. 123/432 |
| 4,452,208 | A | * | 6/1984 | Merlini et al. ............. 123/559.1 |
| 4,498,429 | A | * | 2/1985 | Satow et al. ................... 123/432 |
| 5,379,743 | A | | 1/1995 | Stokes et al. |
| 5,417,068 | A | | 5/1995 | Olofsson |
| 5,709,191 | A | | 1/1998 | Monnier |
| 6,135,088 | A | | 10/2000 | Duret |
| 6,382,193 | B1 | * | 5/2002 | Boyer et al. ................... 123/560 |

(Continued)

FOREIGN PATENT DOCUMENTS

DE    3824346 A1 * 12/1989
EP    0 675 274 A1    10/1995

(Continued)

OTHER PUBLICATIONS

A Macine Translation Irisawa (Pub. Number JP 2007-162489-A), Published on Jun. 28, 2007.*

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Methods and systems are provided for a boosted engine having a split intake system coupled to a split exhaust system. Aircharges of differing composition, pressure, and temperature may be delivered to the engine through the split intake system at different points of an engine cycle. In this way, boost and EGR benefits may be extended.

19 Claims, 9 Drawing Sheets

U.S. PATENT DOCUMENTS

| | | | |
|---|---|---|---|
| 6,438,956 B1 | 8/2002 | Olofsson | |
| 6,460,337 B1 | 10/2002 | Olofsson | |
| 6,722,344 B2 * | 4/2004 | Ashida et al. | 123/432 |
| 6,742,495 B2 * | 6/2004 | Ashida et al. | 123/568.17 |
| 6,953,030 B2 | 10/2005 | Linderyd et al. | |
| 7,258,100 B2 * | 8/2007 | Pinkston | 123/90.16 |
| 7,721,541 B2 * | 5/2010 | Roberts et al. | 60/605.2 |
| 7,997,237 B2 * | 8/2011 | Surnilla | 123/90.15 |
| 8,011,185 B2 * | 9/2011 | Inoue et al. | 60/605.2 |
| 2007/0119168 A1 | 5/2007 | Turner | |
| 2011/0167815 A1 | 7/2011 | Ulrey et al. | |
| 2011/0219767 A1 * | 9/2011 | Miyashita | 60/600 |
| 2012/0118274 A1 * | 5/2012 | Keating | 123/559.1 |

FOREIGN PATENT DOCUMENTS

| | | | |
|---|---|---|---|
| EP | 0 797 731 B1 | | 9/1998 |
| EP | 1 493 907 A2 | | 1/2005 |
| EP | 2 003 306 A2 | | 12/2008 |
| JP | 56154127 A | * | 11/1981 |
| JP | 62189326 A | * | 8/1987 |
| JP | 2007162489 A | * | 6/2007 |
| JP | 2007239493 A | * | 9/2007 |
| JP | 2007239688 A | * | 9/2007 |
| JP | 2010-007655 A | | 1/2010 |
| WO | WO 2007069044 A1 | * | 6/2007 |
| WO | WO 2007099426 A1 | * | 9/2007 |
| WO | 2009/022210 A2 | | 2/2009 |

OTHER PUBLICATIONS

A Macine Translation Irisawa (Pub. Number JP 2007-239493-A), Published on Sep. 20, 2007.*

Ulrey, Joseph Norman et al., "Method and System for a Turbocharged Engine," U.S. Appl. No. 13/182,372, filed Jul. 13, 2011, 67 pages.

Pursifull, Ross Dykstra et al., "Method and System for a Turbocharged Engine," U.S. Appl. No. 13/182,375, filed Jul. 13, 2011, 69 pages.

Pursifull, Ross Dykstra et al., "Method and System Adjusting an Exhaust Heat Recovery Valve," U.S. Appl. No. 12/878,846, filed Sep. 9, 2010, 39 pages.

* cited by examiner

| Condition | First intake passage with first intake valve at first, earlier timing | Second intake passage with second intake valve at second, later timing |
|---|---|---|
| Cond_1 | Fresh intake air at/below BP | Boosted fresh intake air |
| Cond_2 | LP-EGR | Boosted fresh intake air |
| Cond_3 | Mixture of fresh intake air at/below BP and LP-EGR | Boosted fresh intake air |
| Cond_4 | LP-EGR | HP-EGR |
| Cond_5 | Fresh intake air at/below BP | HP-EGR |
| Cond_6 | Mixture of fresh intake air at/below BP and LP-EGR | HP-EGR |
| Cond_7 | LP-EGR | Mixture of boosted fresh intake air and HP-EGR |
| Cond_8 | Mixture of fresh intake air at/below BP and LP-EGR | Mixture of boosted fresh intake air and HP-EGR |
| Cond_9 | Fresh intake air at/below BP | Mixture of boosted fresh intake air and HP-EGR |

METHOD AND SYSTEM FOR A TURBOCHARGED ENGINE

CROSS REFERENCE TO RELATED APPLICATIONS

The present application is a continuation-in-part of U.S. patent application Ser. No. 12/878,838, entitled "Method and system for turbocharging an engine" filed Sep. 9, 2010, now U.S. Pat. No. 8,069,663 the disclosure of which is hereby incorporated by reference.

FIELD

The present description relates to a method for improving thermal efficiency of a turbocharged engine. The method may be particularly useful for providing EGR in a turbocharged engine.

BACKGROUND AND SUMMARY

Engine cylinders may be configured with one or more intake ports for receiving an aircharge. The one or more intake ports may diverge from a common intake passage or may have distinct intake ducts. Further, the one or more intake ports may receive fresh air or may recirculate exhaust gases.

One example of a cylinder with a split intake system is shown by Duret in U.S. Pat. No. 6,135,088. Therein, at low load conditions, a first inlet port of the cylinder is configured to receive recirculated exhaust gas while a second inlet port is configured to receive an air-fuel mixture that has been boosted following passage through a compressor.

However, the inventors herein have identified potential issues with such a system. As one example, addition of an exhaust turbine to drive the compressor may destroy the intended functionality of the system. Specifically, if a turbine were included in the common exhaust port, high pressure exhaust would be drawn into the lower pressure (that is, unboosted) inlet port leading to EGR control issues. As another example, it may be difficult to provide higher pressure EGR (HP-EGR) to further improve engine performance during some conditions.

Thus, in one example, some of the above issues may be at least partly addressed by a method of operating an engine comprising, providing a first aircharge at or below barometric pressure to an engine cylinder through a first intake passage and providing a second, boosted aircharge to the cylinder through a second, separate intake passage, the second aircharge boosted via an intake compressor driven by an exhaust turbine. In this way, an intake compressor may be driven by an exhaust turbine to provide a boosted intake aircharge to a cylinder through an intake passage while a naturally aspirated intake aircharge is provided to the cylinder, in parallel, through a separate intake passage. The different aircharges may then be mixed with each other, and fuel, in the cylinder prior to combustion.

In one example, the first intake passage may be coupled to a first exhaust passage while the second, separate intake passage is coupled to a second, separate exhaust passage. A turbocharger compressor coupled only to the second intake passage may be driven by a turbocharger turbine, coupled only to the second exhaust passage, to thereby provide a boosted aircharge in the second intake passage. In one example, fresh air at or below barometric pressure (BP) may be delivered to the cylinder via a first intake valve communicating with the first intake passage, while fresh air at compressor pressure (that is, boosted air) is delivered to the cylinder via a second intake valve communicating with the second intake passage. In this way, at least a portion of the fresh intake air can be provided via natural aspiration while the other portion is compressed. By reducing the portion of intake air requiring compression, compressor efficiency can be increased and control delays can be reduced. Additionally, the desired boost can be provided via a smaller compressor and turbine, without compromising boost performance.

In an alternate example, one or both of the first and second aircharges may include at least some fresh air and at least some recirculated exhaust gas. For example, at least some lower pressure EGR (LP-EGR), recirculated from the first exhaust passage to the first intake passage, may be mixed with fresh air at or below BP in the first intake passage to form a first aircharge. Additionally at least some higher pressure EGR (HP-EGR), recirculated from the second exhaust passage to the second intake passage, may be mixed with boosted fresh air in the second intake passage to form a second aircharge. The first and second aircharges may be mixed with each other, and directly injected fuel, in the cylinder prior to combustion. A timing of opening of distinct intake valves coupled to the distinct intake passages may be varied relative to each other so as to deliver the different aircharges at different points of an engine intake stroke. The intake valve timings may be further coordinated with the opening of distinct exhaust valves coupled to the distinct exhaust passages.

In this way, by flowing only a portion of the exhaust gas through the turbine while naturally aspirating the remaining portion of exhaust gas into the cylinder, heat recovered from the exhaust gas is increased and the thermodynamic efficiency of the turbine is improved. By naturally aspirating some fresh air into the engine cylinder while boosting the remaining portion, compressor work may be reduced, thereby improving compressor efficiency. Additionally, boost control delays can be reduced. By providing aircharge with varying ratios of recirculated exhaust gas and fresh air at different pressures to an engine cylinder via distinct intake passages, EGR benefits may be extended and turbocharger benefits can be improved, even with the use of a smaller turbocharger. As such, engine efficiency and performance can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 depicts example aircharge mixtures that may be provided to the cylinder of FIG. 2 via the first and second intake passages during different operating conditions.

FIG. 8 shows a graph explaining example intake air throttle and EGR valve adjustments during a tip-in.

DETAILED DESCRIPTION

Figure 1:
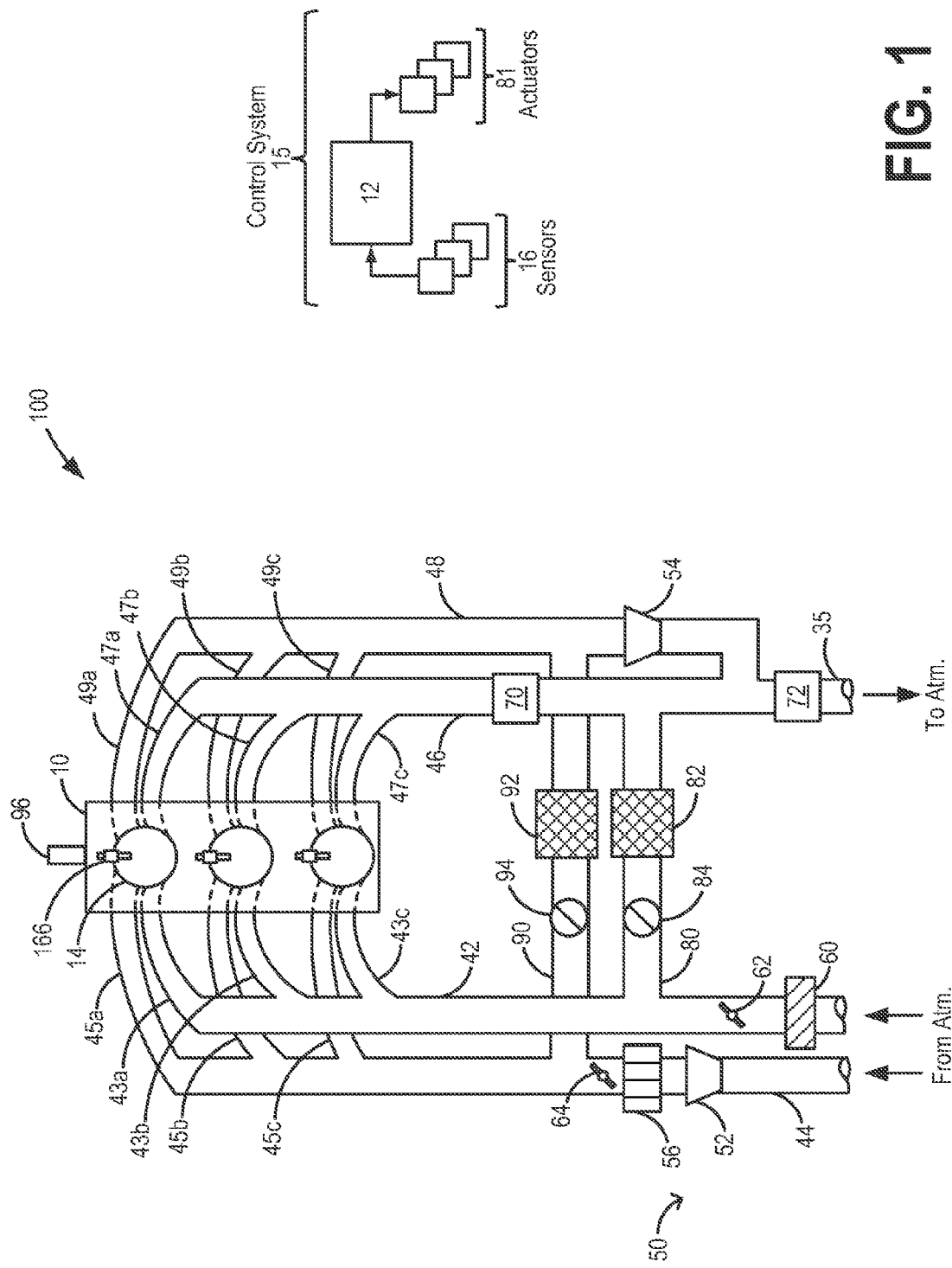
FIG. 1 shows a schematic depiction of an engine including a split intake manifold and a split exhaust manifold and associated exhaust gas recirculation systems.
Figure 2:
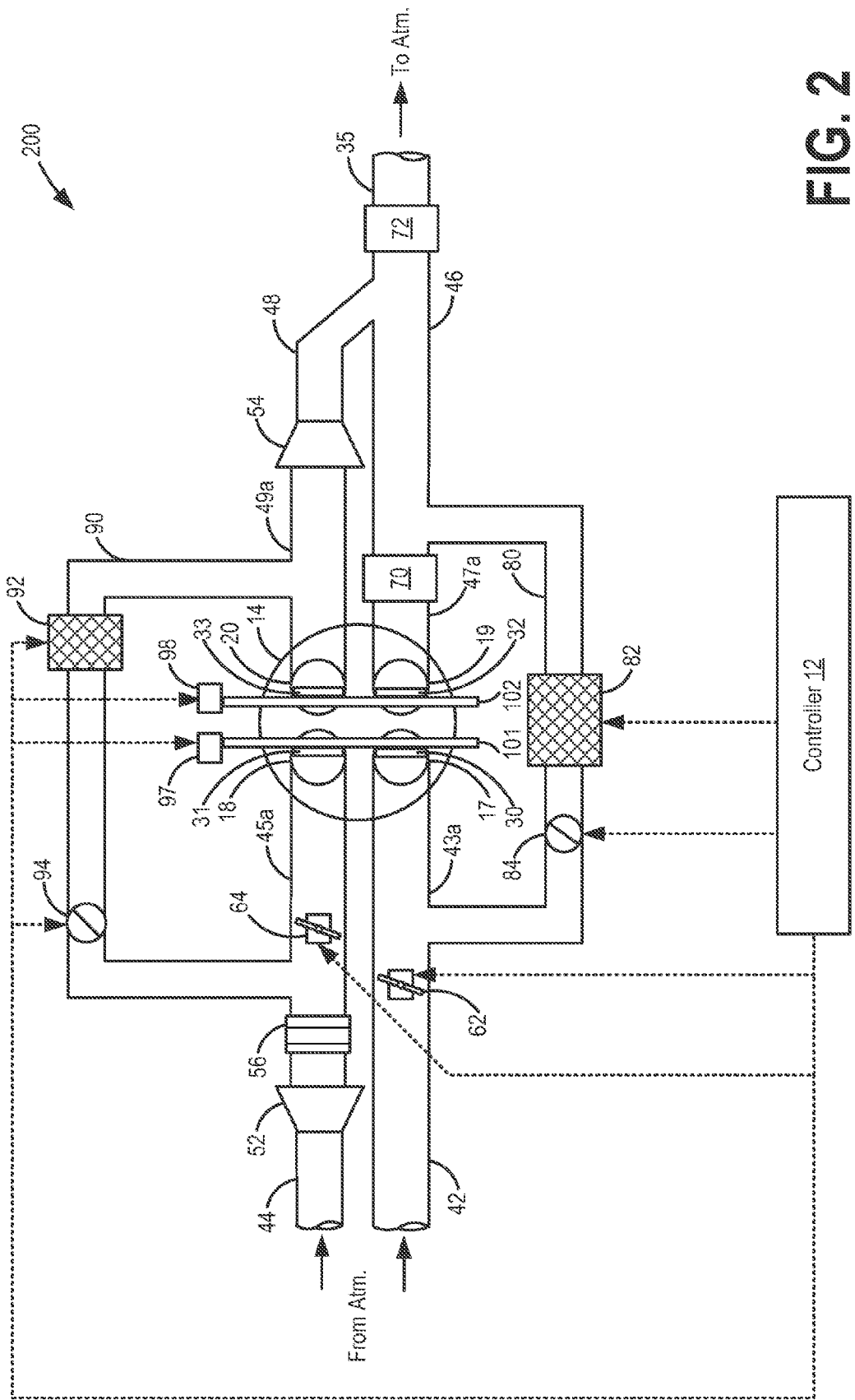
FIG. 2 shows an example embodiment of an engine cylinder of FIG. 1 coupled to first and second intake passages, as well as first and second exhaust passages.
Figure 3:
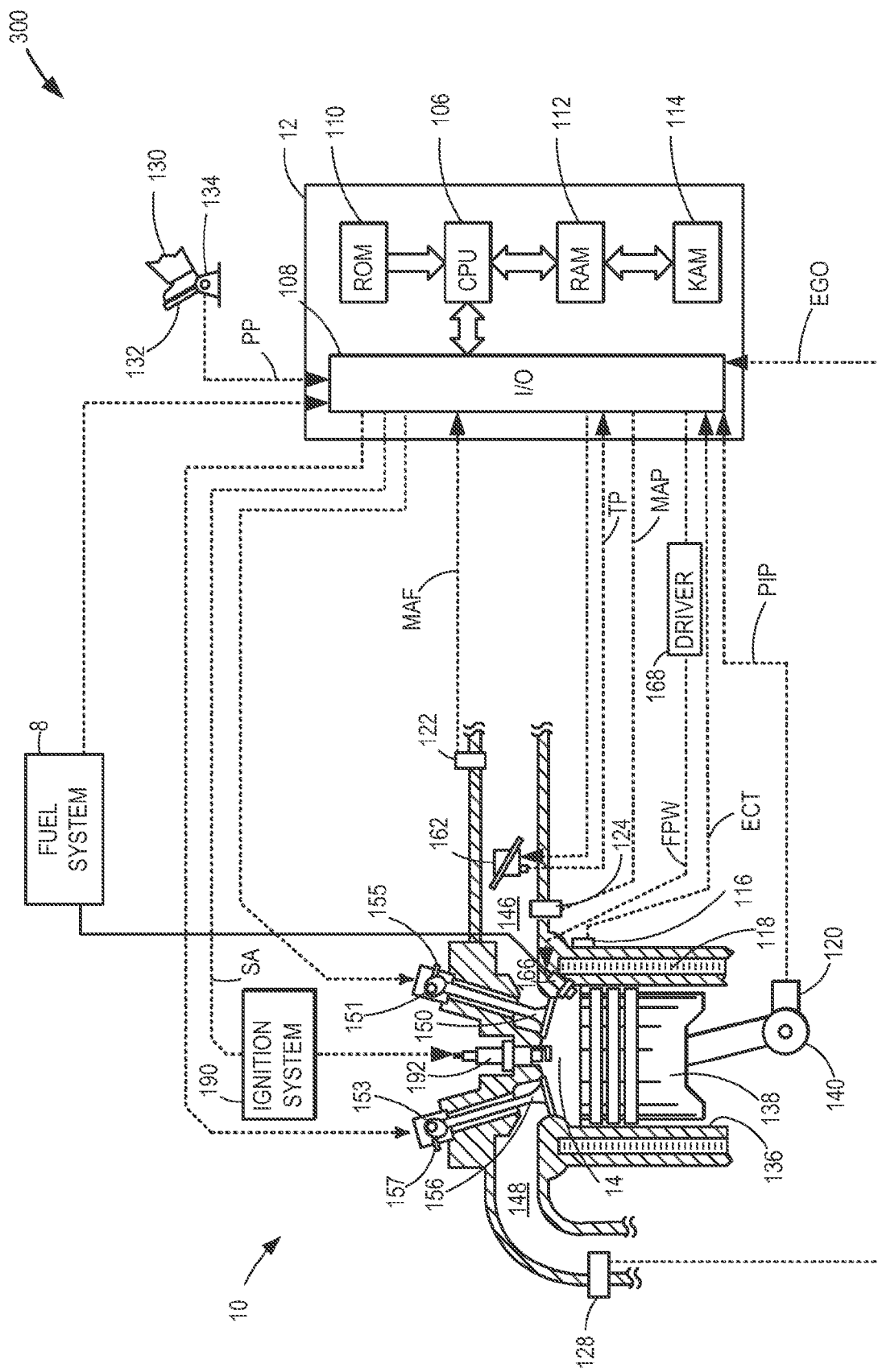
FIG. 3 shows a partial engine view.

The following description relates to systems and methods for controlling an engine, such as the engine system of FIGS. 1-3, by providing aircharge of differing pressure and/or differing composition (e.g., different fresh air to EGR ratios) to an engine cylinder through distinct intake passages at different times in an engine cycle. Specifically, an intake aircharge at or below barometric pressure can be provided to the cylinder separate from an intake aircharge at compressor pressure. Likewise, an intake aircharge including recirculated exhaust gas can be provided to the cylinder separate from an intake aircharge having fresh air. Still other combinations may be possible, as elaborated in FIG. 6. An engine controller may be configured to perform a control routine, such as the routine of FIG. 4, to open a first cylinder intake valve at an earlier timing than a second cylinder intake valve (FIG. 5), thereby providing a first aircharge of a first composition at a different time in the engine cycle than a second aircharge of a second composition. The intake valve timings may be further coordinated with corresponding exhaust valve timings (FIG. 5). The position of one or more air intake throttles and EGR valves coupled to the different intake passages may be adjusted and coordinated to compensate for transients, as elaborated in FIGS. 7-8. Additionally, the various EGR valves may be adjusted to enable the intake aircharge of each intake passage to be heated or cooled by respective EGR coolers, as elaborated in FIG. 9. In this way, an amount of turbocharger compression work expended on drawing EGR may be reduced, thereby increasing the average intake and/or exhaust gas pressure supplied to and from the turbocharger, improving turbocharger output. Additionally, by keeping an EGR-based aircharge separate from a boost-based aircharge until they are mixed in the cylinder, both EGR control and boost control delays may be reduced. Overall, the benefits of both EGR and boosting can be extended, thereby improving engine performance and fuel economy.

FIG. 1 shows a schematic depiction of an example turbocharged engine system 100 including a multi-cylinder internal combustion engine 10 and a turbocharger 50. As a non-limiting example, engine system 100 can be included as part of a propulsion system for a passenger vehicle. Engine 10 may include a plurality of cylinders 14. In the depicted example, engine 10 includes three cylinders arranged in an in-line configuration. However, in alternate examples, engine 10 can include two or more cylinders such as 4, 5, 8, 10 or more cylinders, arranged in alternate configurations, such as V, boxed, etc. Each cylinder 14 may be configured with a fuel injector 166. In the depicted example, fuel injector 166 is a direct in-cylinder injector. However, in other examples, fuel injector 166 can be configured as a port based fuel injector. Further details of a single cylinder 14 are described below in FIGS. 2-3.

Each cylinder 14 of engine 10 is configured to receive an intake aircharge (including fresh air and/or recirculated exhaust gas) from a first intake passage 42, as well as a second intake passage 44. As such, second intake passage 44 may be separate from, but parallel to, first intake passage 42. First intake passage 42 may include an air intake throttle 62 downstream of an air filter 60. The position of throttle 62 can be adjusted by control system 15 via a throttle actuator (not shown) communicatively coupled to controller 12. By modulating throttle 62, an amount of fresh air may be inducted from the atmosphere into engine 10 and delivered to the engine cylinders at or below barometric (or atmospheric) pressure via first intake passage 42. First intake passage 42 may be split into multiple intake conduits 43a-43c downstream of throttle 62. Each intake conduit 43a-43c may be coupled to a distinct engine cylinder and may be configured to deliver a portion of the intake aircharge of intake passage 42 to the corresponding cylinder.

Second intake passage 44 may include an air intake throttle 64 downstream of a charge aircooler 56 and a turbocharger compressor 52. Specifically, compressor 52 of turbocharger 50 may be included in, and coupled to, second intake passage 44 but not to first intake passage 42. The position of throttle 64 can be adjusted by control system 15 via a throttle actuator (not shown) communicatively coupled to controller 12. By modulating air intake throttle 64, while operating compressor 52, an amount of fresh air may be inducted from the atmosphere into engine 10 and delivered to the engine cylinders at compressor (or boosted) pressure via second intake passage 44. Second intake passage 44 may be split into multiple intake conduits 45a-45c downstream of throttle 64. Each intake conduit 45a-45c may be coupled to a distinct cylinder and may be configured to deliver a portion of the intake aircharge of intake passage 44 to the corresponding cylinder.

Exhaust gases generated during cylinder combustion events may be exhausted from each cylinder 14 along a first exhaust passage 46 and a second exhaust passage 48. Exhaust passage 46 may be split into multiple exhaust conduits 47a-47c. Specifically, each exhaust conduit 47a-47c may be coupled to a distinct cylinder and may be configured to deliver a portion of exhaust gas discharged from the corresponding cylinder into exhaust passage 46. Exhaust gas flowing through first exhaust passage 46 may be treated by one or more exhaust after-treatment devices, such as catalysts 70 and 72, before being discharged to the atmosphere along tailpipe 35.

In the same way, second exhaust passage 48 may be split into multiple exhaust conduits 49a-49c. Each exhaust conduit may be coupled to a distinct cylinder and may be configured to deliver a portion of exhaust gases discharged from the corresponding cylinder to exhaust passage 48. A turbine 54 of turbocharger 50 may be included in, and coupled to, second exhaust passage 48 but not to first exhaust passage 46. Thus, products of combustion that are exhausted via exhaust passage 48 can be directed through turbine 54 to provide mechanical work to compressor 52 via a shaft (not shown). In some examples, turbine 54 may be configured as a variable geometry turbine, wherein controller 12 may adjust the position of the turbine impeller blades (or vanes) to vary the level of energy that is obtained from the exhaust gas flow and imparted to compressor 52. Alternatively, exhaust turbine 54 may be configured as a variable nozzle turbine, wherein controller 12 may adjust the position of the turbine nozzle to vary the level of energy that is obtained from the exhaust gas flow and imparted to compressor 52.

Exhaust gas flowing through second exhaust passage 48 may be treated by one or more exhaust after-treatment devices, such as catalyst 72, before being discharged to the atmosphere along tailpipe 35. In the depicted example, exhaust gas from second exhaust passage 48 is combined with exhaust gas from first exhaust passage 46 downstream of turbine 54 and catalyst 70, but upstream of catalyst 72 such that the combined exhaust gas is discharged to the atmosphere along tailpipe 35. However, in alternate embodiments, exhaust passage 46 and 48 may not recombine and may discharge exhaust gas via separate tailpipes. Exhaust passages 46 and 48 may also include one or more exhaust gas sensors, as further elaborated in FIG. 3.

Engine 10 may further include one or more exhaust gas recirculation (EGR) passages for recirculating at least a portion of exhaust gas from first and second exhaust passages 46 and 48, to first and second intake passages 42 and 44, respectively. Specifically, first exhaust passage 46 may be communicatively coupled to first intake passage 42 via a first EGR passage 80 including a first EGR cooler 82 and a first EGR valve 84. An engine controller may be configured to open the first EGR valve 84 to recirculate an amount of exhaust gas at or below atmospheric pressure to the first intake passage 42. In this way, low-pressure EGR (LP-EGR) may be diverted from the first exhaust passage to the first intake passage.

Likewise, second exhaust passage 48 may be communicatively coupled to second intake passage 44 via a second EGR passage 90 including a second EGR cooler 92 and a second EGR valve 94. An engine controller may be configured to open the second EGR valve 94 to recirculate an amount of exhaust gas, at compressor pressure, from upstream of the turbine 54 to the second intake passage 44, downstream of the compressor 52. In this way, high-pressure EGR (HP-EGR) may be provided to the engine via the second intake and exhaust passages. By providing LP-EGR through a first EGR passage while providing HP-EGR through a second, separate EGR passage, both HP-EGR and LP-EGR may be provided simultaneously, thereby extending the EGR benefits.

EGR coolers 82 and 92 may be configured to lower a temperature of exhaust gas flowing through the respective EGR passages before recirculation into the engine intake. In an alternate embodiment, EGR coolers 82 and 92 may be positioned at the junction of the EGR passage and the corresponding intake passage. In this position, as elaborated herein with reference to FIG. 9, under certain conditions the EGR cooler(s) may be advantageously used to heat an intake aircharge delivered to the cylinder. Specifically, the EGR cooler may be used to provide a heated aircharge (e.g., heated fresh air, or a mixture of heated exhaust gas and fresh air) to the engine cylinder during some conditions, while proving a cooled aircharge (e.g., cooled EGR) to the engine cylinder during other conditions. In one example, during cold conditions, aircharge delivered to the cylinder via the second intake passage may be heated before entering the compressor to avoid water droplets impinging on the compressor.

In still further embodiments, a conduit may couple the EGR passages. The conduit may coupled the second EGR passage 90, from a position located between EGR valve 94 and EGR cooler 92, to the first EGR passage 80, at a position located between EGR valve 84 and EGR cooler 82. Herein, during some conditions, higher pressure exhaust gas released into the second exhaust passage, via the second exhaust valve, may be cooled in EGR cooler 92 and the heat may be transferred to a coolant. The cooled exhaust gas may be recirculated to the engine intake via the lower pressure first intake passage. Alternatively, the cooled exhaust gas may be exhausted to the atmosphere via first exhaust passage 46 and tailpipe 35. In this way, a larger amount of work may be extracted from the exhaust gas.

Engine system 100 may further include a valve actuator 96 for adjusting valve operation of cylinder 14. Specifically, valve actuator 96 may be configured to open a first intake and/or exhaust valve of cylinder 14 at a first timing while opening a second intake and/or exhaust valve of cylinder 14 at a second timing. In this way, a first aircharge of a first composition at or below barometric pressure may be provided to the engine cylinder at a first timing while a second aircharge of a second, different composition at compressor pressure may be provided to the engine cylinder at a second, different timing. As a non-limiting example, as shown in FIGS. 2-3, valve actuator 96 may be configured as a cam actuator wherein the intake and/or exhaust valves of each cylinder 14 are coupled to respective cams. A controller may be configured to adjust a phase (or cam profile) of valve actuator 96 (or cam actuator) based on engine operating conditions to open a first intake valve at the first timing to deliver the first aircharge while opening a second intake valve at the second timing to deliver the second aircharge. For example, as elaborated herein in FIG. 5, intake valve timings may be staggered to induct a portion of an intake aircharge through the compressor while naturally aspirating the other portion of the intake aircharge.

The controller may be further configured to adjust the valve phase to open a first exhaust valve at a first timing while opening a second exhaust valve at a second, different timing to release exhaust at different pressures while at different positions in an engine cycle. For example, as elaborated herein in FIG. 5, exhaust valve timings may be staggered to separate the release of blow down gases (e.g., expanding exhaust gases in a cylinder before time when a piston of the cylinder reaches bottom dead center expansion stroke) from the release of residual exhaust gases (e.g., gases that remain in the cylinder after blow-down). In one example, by coordinating the timing of the first intake valve with the timing of the first exhaust valve, and likewise the timing of the second intake valve with the timing of the second exhaust valve, exhaust energy can be transferred from the release of blow-down gases through the turbocharger turbine in the second exhaust passage to operate the turbocharger compressor in the second intake passage to provide boost benefits. At the substantially same time, residual gases can be diverted from the first exhaust passage to the first intake passage to provide EGR benefits. In this way, the desired EGR dilution may be provided without expending additional energy on pumping exhaust gas from the exhaust manifold to the intake manifold via an EGR cooler, even at higher loads.

It will be appreciated that while engine system 100 is shown recirculating exhaust gas at or below barometric pressure through the first intake passage, in still further embodiments, such as where the first intake passage is coupled to a fuel vapor recovery system of the engine, the first intake passage may be configured to recirculate one or more of purge vapors, crankcase vapors, and gaseous or vaporized fuel vapors to the cylinder at or below barometric pressure.

Engine system 100 may be controlled at least partially by a control system 15 including controller 12 and by input from a vehicle operator via an input device (as shown in FIG. 3). Control system 15 is shown receiving information from a plurality of sensors 16 (various examples of which are described herein) and sending control signals to a plurality of actuators 81. As one example, sensors 16 may include intake air pressure and temperature sensors, MAP sensors and MAT sensors in one or both intake passages. Other sensors may include a throttle inlet pressure (TIP) sensor for estimating a throttle inlet pressure (TIP) and/or a throttle inlet temperature sensor for estimating a throttle air temperature (TCT) coupled downstream of the throttles in each intake passage. In other examples, one or more of the EGR passages may include pressure, temperature, and air-to-fuel ratio sensors, for determining EGR flow characteristics. Additional system sensors and actuators are elaborated below with reference to FIG. 3.

As another example, actuators 81 may include fuel injector 166, EGR valves 84 and 94, valve actuator 96, and throttles 62 and 64. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 4, 7 and 9.

Now referring to FIGS. 2-3, a single cylinder 14 of internal combustion engine 10 is shown. As such, components previously introduced in FIG. 1 are represented with the same reference numbers and are not re-introduced. FIG. 2 shows a first view 200 of cylinder 14. Herein, cylinder 14 is shown with four ports including two intake ports 17 and 18, and two exhaust ports 19 and 20. Specifically, first intake port 17 of cylinder 14 may receive a first aircharge at or below atmospheric pressure via a first intake valve 30 from first intake conduit 43a coupled to first intake passage 42. The first aircharge may include fresh air, recirculated exhaust gas of a lower pressure (LP-EGR) or a mixture of fresh air and LP-EGR, introduced into the cylinder at or below atmospheric pressure. Second intake port 18 of cylinder 14 may receive a second aircharge at compressor pressure via a second intake valve 31 from second intake conduit 45a coupled to second intake passage 44. The second aircharge may include fresh air, recirculated exhaust gas of a higher pressure (HP-EGR) or a mixture of fresh air and HP-EGR, introduced into the cylinder at a boosted pressure after being compressed by compressor 52.

A portion of cylinder combustion products may be discharged from a first exhaust port 19 of cylinder 14 via a first exhaust valve 32 into first exhaust conduit 47a coupled to first exhaust passage 46. Another portion of cylinder combustion products may be discharged from a second exhaust port 20 of cylinder 14 via a second exhaust valve 33 into second exhaust conduit 49a coupled to second exhaust passage 48. Exhaust gas may be subsequently released to the atmosphere along tailpipe 35. Specifically, the first and second exhaust passages may recombine downstream of the turbine and upstream of emission control device 72 allowing exhaust gas released into the first exhaust passage to be treated by emission control devices 70 and 72 prior to release while allowing exhaust gas released into the second exhaust passage to be treated by device 72 prior to release along tailpipe 35. Additionally or optionally, a portion of the exhaust gas may also be recirculated from first exhaust conduit 47a to first intake passage 43a via first EGR passage 80 while a portion of exhaust gas may be recirculated from second exhaust conduit 49a to first intake conduit 45a via second EGR passage 90. In still other embodiments, the second exhaust passage may be configured to provide exhaust gas to the first or second intake passage, and the first exhaust passage may be configured to provide exhaust gas to either the first or second intake passage.

In the depicted example, first intake valve 30 and second intake valve 31 may each be operated by respective intake valve cams (FIG. 3). The position of the intake cams, and thereby the timing of the intake valves, may be determined by an intake cam actuator 97 via camshaft rod 101. Likewise, first exhaust valve 32 and second exhaust valve 33 may each be operated by respective exhaust cams (FIG. 3), the position of the exhaust cams determined by an exhaust cam actuator 98 via camshaft rod 102. However, in alternate embodiments, each intake valve and each exhaust valve may have independent valve actuators. Further still, the first intake valve and the first exhaust valve may be coupled to a (common) valve actuator while the second intake valve and the second exhaust valve are coupled to a different valve actuator. Controller 12 may be configured to adjust a phase of intake valve actuator 97 based on engine operating conditions to open first intake valve 30 at a first intake valve timing and open second intake valve 31 at a second, different intake valve timing. For example, the first timing may be adjusted relative to the second timing so as to provide a first intake aircharge including fresh air and/or recirculated exhaust gas to cylinder 14 at a first, lower pressure earlier in the engine cycle (e.g., at an earlier part of an intake stroke) while providing a second intake aircharge including fresh air and/or recirculated exhaust gas to cylinder 14 at a second, higher pressure later in engine cycle (e.g., at a later part of the same intake stroke in the same engine cycle).

In the same way, controller 12 may be configured to adjust a phase of exhaust valve actuator 98 based on engine operating conditions to open first exhaust valve 32 and second exhaust valve 33 at specified timings. In one example, the phase of exhaust valve actuator 97 may be adjusted relative to a phase of valve actuator 98 such that the opening and/or closing of intake valves 30 and 31 is coordinated with (or based on) the opening and/or closing of corresponding exhaust valves 32 and 33. For example, the first exhaust valve may be opened to selectively exhaust (or recirculate) residual exhaust gases while second exhaust valve may be opened to selectively exhaust blow down gases through the turbine, to drive the coupled compressor. Example first and second intake and exhaust valve timings are illustrated in FIG. 5.

Referring to FIG. 3, it shows an alternate view 300 of internal combustion engine 10. Engine 10 is depicted with combustion chamber 14, coolant sleeve 118, and cylinder walls 136 with piston 138 positioned therein and connected to crankshaft 140. Combustion chamber 14 is shown communicating with intake passage 146 and exhaust passage 148 via respective intake valves 150 and exhaust valves 156. As previously elaborated in FIGS. 1-2, each cylinder 14 of engine 10 may receive an intake aircharge along two intake conduits and may exhaust combustion products along two exhaust conduits. In the depicted view 300, intake passage 146 and exhaust passage 148 represent the first intake conduit and first exhaust conduit leading to/from the cylinder (such as conduits 43a and 47a of FIG. 2) while the second intake and second exhaust conduits leading to/from the cylinder are not visible in this view. As also previously elaborated in FIG. 2, each cylinder of engine 10 may include two (or more) intake valves and two (or more) exhaust valves coupled to the respective intake and exhaust conduits. In the depicted view 300, at least one of the intake valves is shown as an intake poppet valve 150 and at least one of the exhaust valves is shown as an exhaust poppet valve 156 located at an upper region of cylinder 14.

Intake valve 150 and exhaust valve 156 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 150 is operated by an intake cam 151 and each exhaust valve 156 is operated by an exhaust cam 153. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 151 includes separate and different cam lobes that provide different valve profiles (e.g., valve timing, valve lift, duration, etc.) for each of the two intake valves of combustion chamber 14. Likewise, exhaust cam 153 may includes separate and different cam lobes that provide different valve profiles (e.g., valve timing, valve lift, duration, etc.) for each of the two exhaust valves of combustion chamber 14. Alternatively, exhaust cam 153 may include a common lobe, or similar lobes, that provide a substantially similar valve profile for each of the two exhaust valves.

For example, a first cam profile of a first intake valve of combustion chamber 14 may have a first lift amount and a first opening timing and duration. A second cam profile of a second intake valve of combustion chamber 14 may have a second lift amount and a second opening timing and duration. In one example, the first lift amount may be less than the second lift amount, the first opening timing may be earlier (or advanced) than the second opening timing, and/or the first opening duration may be shorter than the second opening duration. In addition, in some examples, the phase of the first and second cam profiles may be individually adjusted relative to the phase of the engine crankshaft. Thus, the first intake cam profile can be positioned to open the intake valve near TDC of the intake stroke of combustion chamber 14 so that a first intake valve can open near TDC and close near BDC of the intake stroke. On the other hand, the second intake cam profile can open a second intake valve near BDC of the intake stroke. Thus, the timing of the first intake valve and the second intake valve can separate a first intake aircharge received via a first intake passage from a second intake aircharge received via a second, different intake passage.

In the same way, different cam profiles for the different exhaust valves can be used to separate exhaust gases exhausted at cylinder pressure from exhaust gases exhausted at exhaust pressure. For example, a first exhaust cam profile can open the first exhaust valve after BDC expansion stroke. On the other hand, a second exhaust cam profile can be positioned to open the second exhaust valve at BDC of the expansion stroke such that the second exhaust valve can open and close before BDC expansion stroke. Further, the second cam profile can be adjusted in response to engine speed to adjust exhaust valve opening and closing to selectively exhaust blow-down gas of the combustion chamber. Thus, the timing of the first exhaust valve and the second exhaust valve can isolate cylinder blow-down gases from residual gases. While in the above example the first exhaust valve timing is later in an engine cycle than the second exhaust valve timing, it will be appreciated than in an alternate example, the first exhaust valve timing may be earlier in an engine cycle than the second exhaust valve timing. For example, during surge conditions, the second exhaust valve may be opened after the opening of the first exhaust valve.

By flowing a portion of the exhaust gas (e.g., higher pressure exhaust) through the turbine and a higher pressure exhaust passage, while flowing the remaining portion of the exhaust gas (e.g., lower pressure exhaust) through catalytic devices and a lower pressure exhaust passage, the heat recovered from the exhaust gas can be increased while improving the turbine's work efficiency. By coordinating the timing of the exhaust valves and the timing of the intake valves, a portion of the residual exhaust gases can be delivered to provide EGR while another portion drives the turbocharger compressor. Specifically, in one embodiment, the engine can be cleaved into a naturally-aspirated portion operating at a lower pressure, and a boosted portion operating at a higher pressure providing various synergistic benefits of EGR and boost. In addition, this configuration enables the engine to be operated with a smaller turbine and compressor while yielding lower turbo lag.

In still further embodiments, both exhaust valves may be opened at the same time to provide a waste-gate like behavior. Likewise, both intake valves may be opened at the same time to provide a compressor-bypass valve like behavior. As such, the advantages provided by the split intake manifold may be availed even in the absence of a split exhaust manifold. Further, the advantages may be provided even in the absence of EGR passages. For example, the waste-gate like behavior and compressor-bypass valve like behavior may be achieved whether there are one or more EGR passages, or no EGR passages between the split intake and the split exhaust.

Exhaust gas sensor 128 is shown coupled to exhaust passage 148. Sensor 128 may be positioned in the exhaust passage upstream of one or more emission control devices, such as devices 70 and 72 of FIGS. 1-2. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 3 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 166 may be a port injector providing fuel into the intake port upstream of cylinder 14.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 3 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 199, intake/exhaust valves and cams, etc. The controller may receive input data from the various sensors, process the input data, and trigger the actuators in response to the processed input data based on instruction or code programmed therein corresponding to one or more routines. An example control routine is described herein with regard to FIG. 4.

Figure 4:
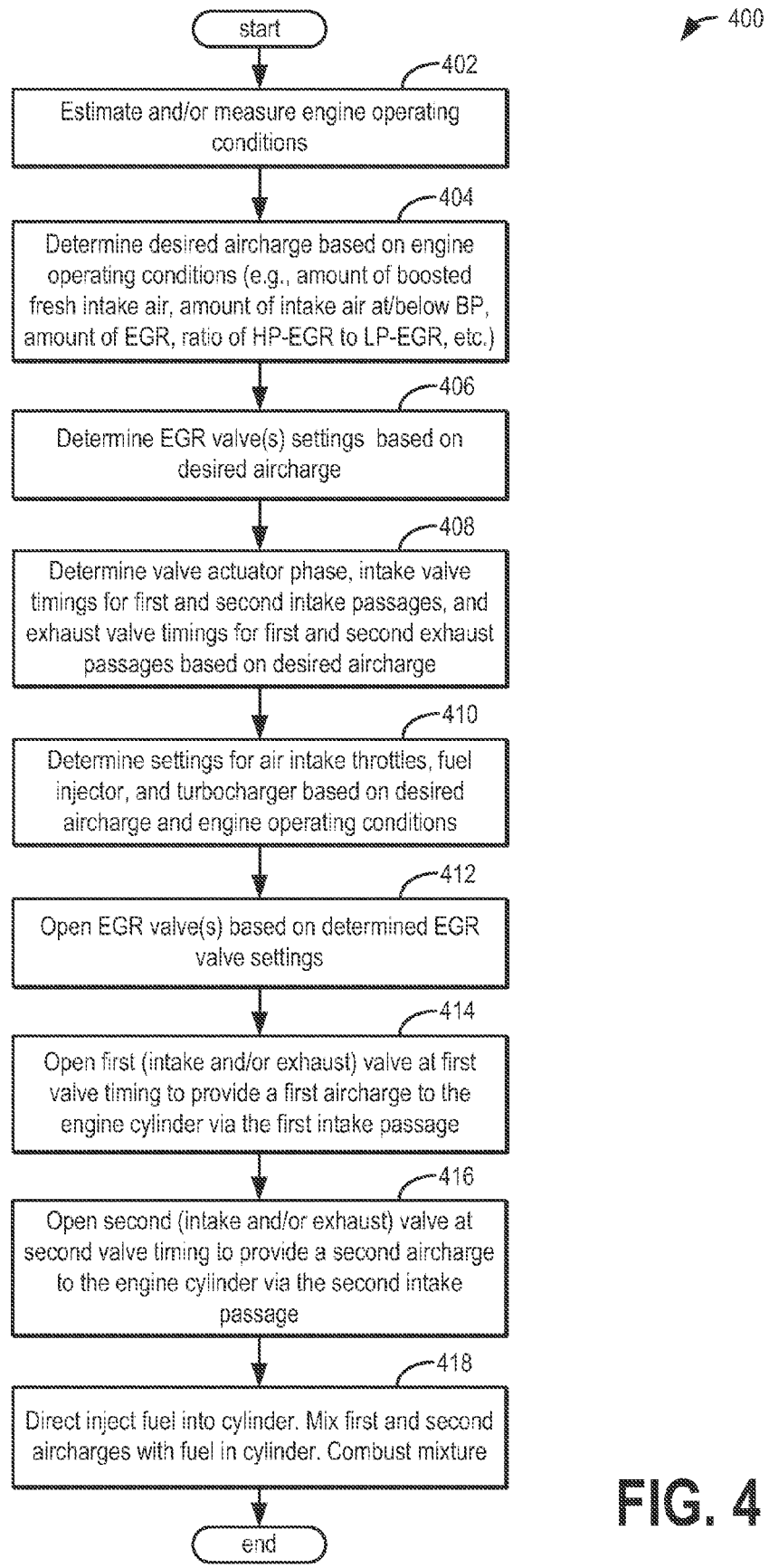
FIG. 4 shows a high level flow chart illustrating a routine that may be implemented for operating the engine cylinder of FIG. 2, according to the present disclosure.
Figure 5:
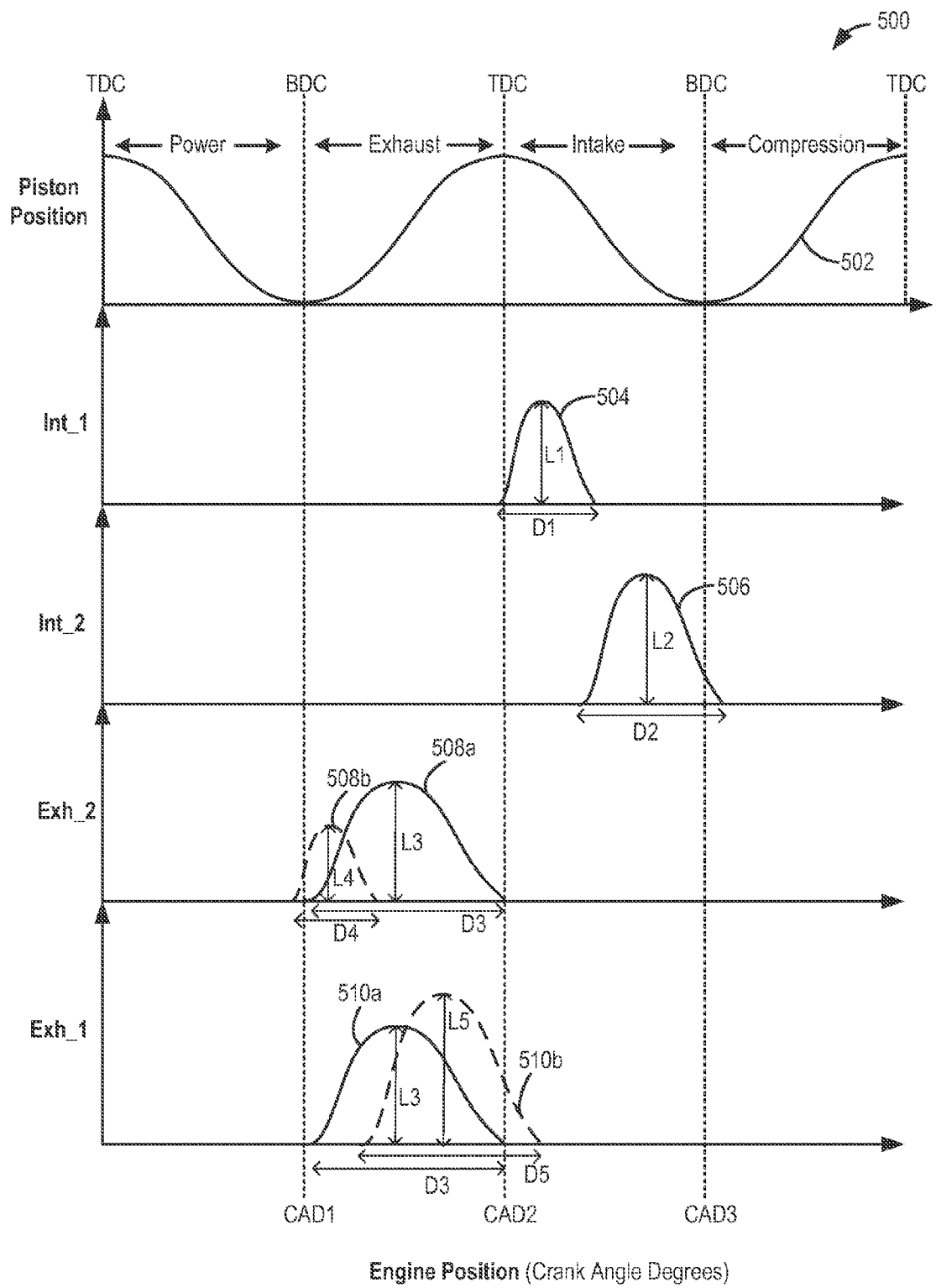
FIG. 5 shows example cylinder intake valve and exhaust valve timings for the engine cylinder of FIG. 2.

Now turning to FIG. 4, an example routine 400 is shown for delivering a first aircharge to an engine cylinder through a first intake passage while delivering a second aircharge to the engine cylinder through a second, parallel but separate intake passage. The first and second aircharges may have different compositions (e.g., differing ratios of fresh air to recirculated exhaust gas), different pressures (e.g., one aircharge at a higher boost pressure while the other aircharge at a lower, sub-barometric pressure), different temperatures (e.g., one aircharge heated to a higher temperature while the other aircharge is cooled to a lower temperature), etc. Further, the different aircharges may be delivered at different timings so as to stagger their delivery during a given intake stroke.

At 402, engine operating conditions may be estimated and/or measured. These may include, for example, ambient temperature and pressure, engine temperature, engine speed, crankshaft speed, transmission speed, battery state of charge, fuels available, fuel alcohol content, catalyst temperature, driver demanded torque, etc.

At 404, based on the estimated engine operating conditions, a desired (total) aircharge may be determined. This may include determining an amount of fresh intake air, an amount of exhaust gas recirculation (EGR), and an amount of boost. Further, a ratio of fresh intake air to be delivered at or below barometric pressure (BP) relative to fresh intake air to be delivered at boost pressure may be determined. Likewise, a ratio of EGR delivered at higher pressure (HP-EGR) relative to EGR delivered at lower pressure (LP-EGR) may be determined.

In one example, in response to a higher torque demand, the desired (total) aircharge may include a higher amount of fresh intake air and a lower amount of EGR. Further, the aircharge may include a higher amount of boosted fresh intake air and a lower amount of fresh air at or below BP. In another example, during mid-high engine load conditions, when the engine is warmed up, the desired (total) aircharge may include a higher amount of EGR and a lower amount of fresh intake air. Further, the aircharge may include a higher amount of LP-EGR and a lower amount of HP-EGR.

Based on the desired total aircharge, the routine may further determine a first aircharge to be delivered to an engine cylinder along a first intake passage at a first, lower pressure (such as, at or below barometric pressure), as well as a second aircharge to be delivered to the cylinder along a second, separate intake passage at a second, higher pressure (such as, at a boost pressure). Specifically, the first and second aircharges may be mixed in the cylinder to provide the desired total aircharge. The first aircharge delivered along the first intake passage may include fresh air, recirculated exhaust gas (LP-EGR) or a combination of the two, delivered at or below barometric pressure. Likewise, the second aircharge delivered along the second intake passage may include fresh air, recirculated exhaust gas (HP-EGR) or a combination of the two, delivered at a boost pressure, or compressor pressure. Various first and second aircharge combinations that may be delivered to the cylinder along the first and second intake passages are further elaborated herein with reference to FIG. 6.

At 406, settings for the first and second EGR valves may be determined based on the desired aircharge. For example, based on the desired aircharge, a first EGR valve in a first EGR passage may be opened by an amount to recirculate a first amount of exhaust gas from a first exhaust passage to a first intake passage. Herein, the first amount of exhaust gas may be at a first, lower pressure (such as, at or below barometric pressure) to thereby provide LP-EGR. As another example, based on the desired aircharge, a second EGR valve in a second, separate EGR passage may be opened by an amount to recirculate a second amount of exhaust gas from a second, separate exhaust passage to a second, separate intake passage. As previously elaborated, the second exhaust passage may be arranged in parallel to the first exhaust passage, the second intake passage may be arranged in parallel to the first intake passage, and the second EGR passage may be arranged in parallel to the first EGR passage, even though all the passages may be separate from each other. Herein, the second amount of exhaust gas may be at a second, higher pressure (such as, at boost or compressor pressure) to thereby provide HP-EGR. Specifically, the second EGR valve may be opened to deliver the second amount of exhaust gas from upstream of a turbocharger turbine coupled to the second exhaust passage to downstream of a turbocharger compressor coupled to the second intake passage.

At 408, based on the desired aircharge, a first intake valve timing for delivering the first aircharge to the cylinder through a first intake valve coupled to the first intake passage, and a second intake valve timing for delivering the second aircharge to the cylinder through a second intake valve coupled to the second intake passage, may be determined. In one example, where the first intake valve and the second intake valve are coupled to an intake valve actuator, a valve phase of the intake valve actuator may be adjusted to open the first intake valve at the first intake valve timing and the second intake valve at the second intake valve timing. The first intake valve timing may be adjusted relative to the second intake valve timing based on engine operating conditions. Specifically, the first timing may be adjusted to be earlier in an engine cycle than the second timing. For example, as elaborated in FIG. 5, the first intake valve timing may be earlier in an intake stroke (that is, closer to intake stroke TDC) while the second timing may be later in the same intake stroke (that is, further from intake stroke TDC).

In addition to first and second intake valve timings, a valve lift as well as a duration of intake valve opening for each intake valve may be determined. The valve phase of the intake valve actuator may be accordingly adjusted. In one example, the first intake valve may be opened with a first amount of valve lift while the second intake valve is opened with a second, different amount of valve lift. For example, as elaborated in FIG. 5, the first amount of valve lift of the first intake valve may be smaller than the second amount of valve lift of the second intake valve. In another example, the first intake valve may be opened for a first duration while the second intake valve is opened for a second, different duration. For example, as elaborated in FIG. 5, the first intake valve may be opened for a smaller duration than the second intake valve.

In the same way, a first exhaust valve timing for a first exhaust valve coupled to the first exhaust passage and a second exhaust valve timing for a second exhaust valve coupled to the second exhaust passage may be determined. In one example, where the first exhaust valve and the second exhaust valve are coupled to an exhaust valve actuator, a valve phase of the exhaust valve actuator may be adjusted to open the first exhaust valve at the first exhaust valve timing and the second exhaust valve at the second exhaust valve timing. The first intake valve timing and the second intake valve timing may be selected based on engine operating conditions. In one example, as elaborated in FIG. 5, the first and second exhaust valves may be opened at a common exhaust valve timing. Alternatively, they may be staggered.

The valve phase of the intake and exhaust valve actuators may also be adjusted so as to coordinate the timing of the exhaust valve events with a timing of the intake valve events. Specifically, the first intake valve timing of the first intake valve may be based on a first exhaust valve timing of the first exhaust valve (e.g., the first intake valve timing may be retarded from the first exhaust valve timing by a predetermined amount), while the second intake valve timing of the second intake valve may be based on a second exhaust valve timing of the second exhaust valve (e.g., the second intake valve timing may be retarded from the second exhaust valve timing by a predetermined amount).

At 410, based on the desired aircharge and the engine operating conditions, settings for air intake throttles coupled to each intake passage may be determined. Further, fuel injector settings (e.g., timing, amount of injection, duration of opening, etc.) as well as turbocharger settings may be determined. For example, a compressor setting for the turbocharger coupled to the second intake passage may be determined based on the amount of boost desired (e.g., based on the amount of boosted aircharge desired).

At 412, based on the determined EGR valve settings, the first and second EGR valves may be opened. Specifically, the routine includes opening a first EGR valve in a first EGR passage to recirculate a first amount of exhaust gas, at or below barometric pressure, from the first exhaust passage to the first intake passage. The routine further includes opening a second EGR valve in a second EGR passage to recirculate a second amount of exhaust gas, at compressor pressure (that is, boost pressure), from the second exhaust passage, upstream of the turbocharger turbine, to the second intake passage, downstream of the turbocharger compressor.

At 414, the routine includes opening the first intake valve of the first intake passage at the first intake valve timing to deliver the first (unboosted) aircharge at or below barometric pressure to the cylinder. At 416, the routine includes opening the second intake valve of the second intake passage at the second intake valve timing to deliver the second (boosted) aircharge at compressor pressure to the cylinder. As such, providing the second boosted aircharge includes operating the turbocharger compressor, coupled to the second intake passage (and not coupled to the first intake passage), according to the determined boost settings.

As further elaborated with reference to FIG. 6, the first and second aircharges may include various combinations of fresh air and recirculated exhaust gas at varying pressures. For example, the first aircharge being delivered to the cylinder may include a first amount of fresh intake air and a first amount of recirculated exhaust gas (LP-EGR) at or below barometric pressure while the second aircharge being delivered to the cylinder may include a second amount of fresh intake air and a second amount of recirculated exhaust gas (HP-EGR) at boost pressure.

At 418, the routine includes direct injecting an amount of fuel into the cylinder and mixing the first aircharge with the second aircharge and the injected fuel in the cylinder. The mixture of the injected fuel and the first and second aircharges may then be combusted in the cylinder. In one example, where the first intake aircharge includes recirculated exhaust gas only and the second intake aircharge includes fresh air only, the fresh air and the EGR may be separately delivered to the cylinder along separate intake passages, and then the aircharges may be mixed, for the first time, in the cylinder. The mixed aircharge may then be further mixed with injected fuel and combusted in the cylinder. In another example, where the first intake aircharge includes LP-EGR only and the second intake aircharge includes HP-EGR only, the recirculated exhaust gases of different pressures may be separately delivered to the cylinder along the separate intake passages, and then mixed, for the first time, in the cylinder. Likewise, in an example where the first intake aircharge includes fresh intake air at or below atmospheric pressure and the second intake aircharge includes boosted fresh intake air, the fresh air of different pressures may be separately delivered to the cylinder along the separate intake passages, and then mixed, for the first time, in the cylinder In still another example, where each of the first aircharge and the second aircharge include at least some fresh air and at least some recirculated exhaust gas, a first amount of LP-EGR may be mixed with a first amount of fresh intake air at or below barometric pressure in the first intake passage to form the first aircharge while a second amount of HP-EGR may be mixed with a second amount of boosted fresh intake air at compressor pressure in the second intake passage to form the second aircharge. Each aircharge may then be delivered separately to the engine cylinder and mixed, for the first time, in the cylinder rather than earlier in the intake passage. The mixture of aircharges may then be further mixed with injected fuel and combusted in the cylinder.

In this way, the different aircharges may be delivered separately but mixed thoroughly in the cylinder to provide a homogenized cylinder aircharge. By allowing the aircharge homogenization to occur in the cylinder, engine performance and EGR benefits may be increased. By adjusting a first timing of the first intake valve relative to a second timing of the second intake valve and a timing of the first and second exhaust valves, the different aircharges may be delivered at different times but may be mixed in the cylinder to provide a homogenized final cylinder aircharge.

Now turning to FIG. 5, map 500 depicts example intake valve timings and exhaust valve timings, with respect to a piston position, for an engine cylinder configured to receive a first intake aircharge from a first intake passage through a first intake valve, receive a second intake aircharge from a second, separate intake passage through a second, different intake valve, and exhaust cylinder combustion products into each of a first exhaust passage through a first exhaust valve, and to a second, different exhaust passage through a second exhaust valve. By adjusting a first timing of the first intake valve relative to a second timing of the second intake valve and a timing of the first and second exhaust valves, the different aircharges may be delivered at different times to provide some stratification, but may be mixed in the cylinder to provide a homogenized final cylinder aircharge.

Map 500 illustrates an engine position along the x-axis in crank angle degrees (CAD). Curve 502 depicts piston positions (along the y-axis), with reference to their location from top dead center (TDC) and/or bottom dead center (BDC), and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, exhaust valves are opened to release the residual combusted air-fuel mixture to the corresponding exhaust passages and the piston returns to TDC.

Curve 504 depicts a first intake valve timing, lift, and duration for a first intake valve (Int_1) coupled to a first intake passage of the engine cylinder while curve 506 depicts a second intake valve timing, lift, and duration for a second intake valve (Int_2) coupled to a second intake passage of the engine cylinder. Curves 508a and 508b depict example exhaust valve timings, lifts, and durations for a second exhaust valve (Exh_2) coupled to a second exhaust passage of the engine cylinder, while curves 510a and 510b depict example exhaust valve timings, lifts, and durations for a first exhaust valve (Exh_1) coupled to a first exhaust passage of the engine cylinder. As previously elaborated, the first and second intake passages may be separate from, but arranged parallel to each other. Likewise, the first and second exhaust passages may be separate from, but arranged parallel to each other. Further, the first intake passage may be communicatively coupled to the first exhaust passage via a first EGR passage while the second intake passage may be communicatively coupled to the second exhaust passage via a second EGR passage.

In the depicted example, the first intake valve is opened at a first timing (curve 502) that is earlier in the engine cycle than the second timing (curve 504) at which the second intake valve is opened. Specifically, the first timing for the first intake valve is closer to intake stroke TDC, just before CAD2 (e.g., at or just before intake stroke TDC). In comparison, the second timing for the second intake valve is retarded from intake stroke TDC, after CAD2 but before CAD3. In this way, the first intake valve may be opened at or before the start of an intake stroke and may be closed before the intake stroke ends, while the second intake valve may be opened after the start of the intake stroke and may remain open at least until a subsequent compression stroke has commenced.

Additionally, the first intake valve may be opened at the first timing with a first, lower amount of valve lift L1 while the second intake valve may be opened at the second timing with a second, higher amount of valve lift L2. Further still, the first intake valve may be opened at the first timing for a first, shorter duration D1 while the second intake valve may be opened at the second timing for a second, longer duration D2.

In one example, where the first and second intake valves are coupled to an intake valve actuator, a valve phase of the actuator may be adjusted to open the first intake valve at the first timing while opening the second intake valve at the second timing. The valve phase of the actuator may also be adjusted to enable the first intake valve to be opened with the first amount of valve lift for the first duration while opening the second intake valve with the second, different amount of valve lift for the second duration. While the depicted example illustrates different timing, lifts and durations for the different intake valves, it will be appreciated that in alternate embodiments, the intake valves may have the same amount of valve lift and/or same duration of opening while opening at staggered timings.

Now turning to the exhaust valves, curves 508a and 510a depict a first example of exhaust valve timing wherein both the first and the second exhaust valves (Exh_1, Exh_2) are opened at a common timing, starting substantially at exhaust stroke BDC, at or around CAD1, and ending substantially at exhaust stroke TDC, at or around CAD2. Specifically, in this example, the first and second exhaust valves may be operated within the exhaust stroke. Additionally, in this example, both the first and second exhaust valves are opened with the same amount of lift L3 and for the same duration D3. In the depicted example, lift L3 may have a value smaller than lift L2 but larger than lift L1 of the intake valves. In one example, lift L3 may have a value equal to the mean or average of lifts L1 and L2.

Curves 508b and 510b depict a second example of exhaust valve timing wherein the timing of the first and the second exhaust valves is staggered. Specifically, the second exhaust valve is opened closer to (or at) power (or expansion) stroke BDC, at or just before CAD1 (e.g., at or just before power stroke BDC), while the timing of the second exhaust valve is retarded from power stroke BDC, after CAD1 but before CAD2. In this way, the second exhaust valve may be opened at or before the start of an exhaust stroke, just as the piston bottoms out at the end of the power stroke, and may be closed before the exhaust stroke ends. In comparison, the first exhaust valve may be opened after the start of the exhaust stroke and may remain open at least until a subsequent intake stroke has commenced. Additionally, the second exhaust valve may be opened with a second, lower amount of valve lift L4 while the first exhaust valve is opened with a first, higher amount of valve lift L5. Further still, the second exhaust valve may be opened for a second, shorter duration D4 while the first exhaust valve is opened for a first, longer duration D5. In the depicted example, the first exhaust valve timing is later in the engine cycle than the second exhaust valve timing. However, in an alternate embodiment, such as during surge conditions, the first exhaust valve timing may be earlier in the engine cycle than the second exhaust valve timing. In still further examples, both exhaust valves may be opened at the same time to provide a waste-gate like behavior. Likewise, both intake valves may be opened at the same time to provide a compressor-bypass valve like behavior.

In one example, a cam profile of the second exhaust valve can be adjusted to open and close the second exhaust valve at expansion stroke BDC and selectively exhaust blow-down gases of the cylinder into the second exhaust passage. On the other hand, the cam profile of the first exhaust valve may be adjusted to open the exhaust valve after expansion stroke BDC and selectively exhaust the remaining residual gases of the cylinder into the first exhaust passage.

In one example, where the first and second exhaust valves are coupled to an exhaust valve actuator, a valve phase of the actuator may be adjusted to open the first exhaust valve at the first timing while opening the second exhaust valve at the second (same or different) timing. The valve phase of the actuator may also be adjusted to enable the first exhaust valve to be opened with the first amount of valve lift and for the first duration while opening the second intake valve with the second (same of different) amount of valve lift and for the second (same or different) duration. For example, the valve phase of the intake valve actuator may be adjusted based on the valve phase of the exhaust valve actuator to enable a staggered intake valve timing (as shown in curves 504, 506) to be coordinated with a staggered exhaust valve timing (as shown in curves 508b, 510b). Additionally, an amount of overlap between the intake valve timings and the exhaust valve timings may be adjusted to adjust the amount of EGR provided to the cylinder. In still further examples, both exhaust valves may be opened at the same time to provide a waste-gate like behavior. Likewise, both intake valves may be opened at the same time to provide a compressor-bypass valve like behavior. In the same way, an amount of valve overlap between the exhaust valves may be adjusted based on the desired waste-gating, and the amount of valve overlap between the intake valves may be adjusted based on the desired compressor bypassing.

In this way, using different exhaust valve timings, engine efficiency can be increased while engine emissions are reduced by separating exhaust gases released at higher pressure (e.g., expanding blow-down exhaust gases in a cylinder before time when a piston of the cylinder reaches bottom dead center expansion stroke) from exhaust gases released at lower pressure (e.g., residual exhaust gases that remain in the cylinder after blow-down) into the different exhaust passages. In particular, exhaust energy can be transferred from the blow-down gases to one of two exhaust passages to operate a turbocharger turbine (which in turn drives a turbocharger compressor) or provide EGR at a higher pressure. At the substantially same time, residual gases may be directed to the other exhaust of the two exhaust passages to heat a catalyst, thereby reducing engine emissions, or to provide EGR at a lower pressure. In this way, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased to improve turbocharger output. Additionally, fuel economy may be improved and particulate emissions may be reduced by decreasing an engine warm-up time. Further, the method can reduce engine emissions since at least a portion of cylinder exhaust gases are directly routed from the cylinder to the catalyst.

Various examples of intake aircharges delivered to the cylinder through the first and second intake passages is now elaborated with reference to FIG. 6. Specifically, table 600 lists example combinations of a first aircharge that is delivered to the cylinder along a first intake passage through a first intake valve at a first, earlier intake valve timing, and a second aircharge that is delivered to the cylinder along a second, separate intake passage through a second, separate intake valve at a second, later intake valve timing. As such, the first and second aircharges may be delivered separately and then mixed (for the first time) in the cylinder with each other and with direct injected fuel prior to combustion of the mixture.

In one example, during a first condition (Cond_1), the first intake aircharge delivered along the first intake passage may include fresh intake air that is naturally aspirated at or below barometric pressure. At the same time, the second intake aircharge may include boosted fresh intake air that is delivered at compressor pressure along the second intake passage. Herein, by providing naturally aspirated fresh intake air and boosted fresh intake air through separate intake passages to the engine cylinder, the naturally-aspirated portion of the intake aircharge can be inducted without investing the work of compression (of the turbocharger) while only the boosted portion of the intake aircharge needs to be compressed. In this way, a thermal efficiency gain is advantageously achieved.

In another example, during a second condition (Cond_2), the first intake aircharge provided along the first intake passage may include at least some recirculated exhaust gas at or below barometric pressure. That is, low pressure-EGR may be recirculated from the first exhaust passage to the first intake passage. At the same time, the second intake aircharge may include boosted fresh intake air that is delivered at compressor pressure along the second intake passage.

Herein, by providing low-pressure EGR and boosted fresh intake air through separate intake passages, LP-EGR may be kept out of the compressed air path. This provides multiple benefits. First, compression work of the turbocharger is not expended on delivering the EGR. As a result, turbocharger compression efficiency is improved. Second, by keeping LP-EGR away from the turbocharger compressor, issues related to compressor fouling and contamination with EGR are reduced. Third, since the boosted fresh intake aircharge is not diluted with EGR, a temperature benefit is achieved in that the charge air cooler is not required to be operated to reduce a temperature of the intake aircharge. Fourth, by separating the boosted intake aircharge from the EGR based intake aircharge, both boost control and EGR control delays can be reduced, providing synergistic benefits. Finally, by dividing the total aircharge into a portion delivered through the naturally-aspirated intake passage (that is, a portion that is not boosted) and a portion that is delivered through the compressor, the compression work required of the compressor is reduced, providing a thermodynamic efficiency advantage. As such, this may enable the same compression to be provided by a smaller turbocharger (having a smaller compressor and/or turbine) without compromising on boosting efficiency and while reducing turbo-lag.

As another example, during a third condition (Cond_3), the first intake aircharge delivered along the first intake passage may include a mixture of recirculated exhaust gas and fresh intake air that is naturally aspirated at or below barometric pressure. Thus, a first amount of LP-EGR may be mixed with a first amount of fresh intake air at or below BP and delivered to the cylinder via the first intake passage. At the same time, the second intake aircharge may include fresh intake air at compressor pressure. Herein, as with the previous example (during Cond_2), by providing at least some EGR via an intake passage that is separate from the intake passage including the compressor, compressor fouling can be reduced, turbocharger and EGR control delays can be reduced, turbocharger efficiency can be improved, and boost and EGR benefits can be extended over a wider engine operating range.

In still another example, during a fourth condition (Cond_4), the first intake aircharge delivered along the first intake passage may include at least some recirculated exhaust gas at or below barometric pressure. At the same time, the second intake aircharge may include at least some recirculated exhaust gas at compressor pressure. That is, LP-EGR may be provided through the first intake passage while HP-EGR is provided through the second intake passage. Herein, by providing LP-EGR and HP-EGR through separate intake passages to the engine cylinder, the benefits of exhaust gas recirculation can be extended to a wider range of engine speed/load conditions. Additionally, HP-EGR and LP-EGR may be independently controlled.

In another example, during a fifth condition (Cond_5), the first intake aircharge delivered along the first intake passage may include fresh intake air that is naturally aspirated at or below barometric pressure. At the same time, the second intake aircharge may include at least some recirculated exhaust gas at compressor pressure. That is, high pressure-EGR (HP-EGR) may be recirculated from the second exhaust passage, upstream of the turbocharger turbine, to the second intake passage, downstream of the turbocharger compressor. Herein, by providing naturally aspirated fresh intake air and boosted EGR through separate intake passages to the engine cylinder, intake air dilution with EGR can be reduced.

In yet another example, during a sixth condition (Cond_6), the first intake aircharge delivered along the first intake passage may include a mixture of recirculated exhaust gas and fresh intake air that is naturally aspirated at or below barometric pressure. At the same time, the second intake aircharge may include at least some recirculated exhaust gas at compressor pressure. Thus, a first amount of LP-EGR may be mixed with a first amount of fresh intake air at or below BP and delivered to the cylinder via the first intake passage, while HP-EGR is delivered to the cylinder via the second intake passage. Herein, as with the previous example (Cond_4), by providing LP-EGR and HP-EGR via separate intake passages, the benefits of exhaust gas recirculation can be extended to a wider range of engine speed/load conditions.

As a further example, during a seventh condition (Cond_7), the first intake aircharge delivered along the first intake passage may include at least some recirculated exhaust gas at or below barometric pressure. At the same time, the second intake aircharge may include a mixture of recirculated exhaust gas and fresh intake air at compressor pressure. Thus, a second amount of HP-EGR may be mixed with a second amount of fresh intake air at compressor pressure and delivered to the cylinder via the second intake passage, while LP-EGR is delivered to the cylinder via the first intake passage. Herein, as with the previous examples (Cond_4, and Cond_6), by providing HP-EGR and LP-EGR via separate intake passages, the benefits of exhaust gas recirculation can be extended to a wider range of engine speed/load conditions.

As yet another example, during an eighth condition (Cond_8), the first intake aircharge delivered along the first intake passage may include a mixture of recirculated exhaust gas and fresh air that is naturally aspirated at or below barometric pressure. At the same time, the second intake aircharge may include a mixture of recirculated exhaust gas and fresh intake air at compressor pressure. Thus, a first amount of LP-EGR may be mixed with a first amount of fresh intake air at or below BP and delivered to the cylinder via the first intake passage while a second amount of HP-EGR may be mixed with a second amount of fresh intake air at compressor pressure and delivered to the cylinder via the second intake passage. Herein, by providing a first aircharge at a first, lower pressure to the cylinder separate from a second aircharge at a second, higher pressure to the cylinder via distinct intake passages, EGR and boost may be used over a wide range of operating conditions while allowing each to be better controlled.

As another example, during a ninth condition (Cond_9), the first intake aircharge delivered along the first intake passage may include fresh intake air that is naturally aspirated at or below barometric pressure. At the same time, the second intake aircharge may include a mixture of recirculated exhaust gas and at least some fresh intake air at compressor pressure. Thus, a second amount of HP-EGR may be mixed with a second amount of fresh intake air at compressor pressure and delivered to the cylinder via the second intake passage, while naturally aspirated fresh intake is delivered to the cylinder via the first intake passage. Herein, by providing a boosted intake aircharge and a naturally aspirated intake aircharge via separate intake passages, the naturally aspirated intake aircharge can be inducted without investing the work of compression while expending the turbocharger's compression work only on the boosted intake aircharge.

Figure 7:
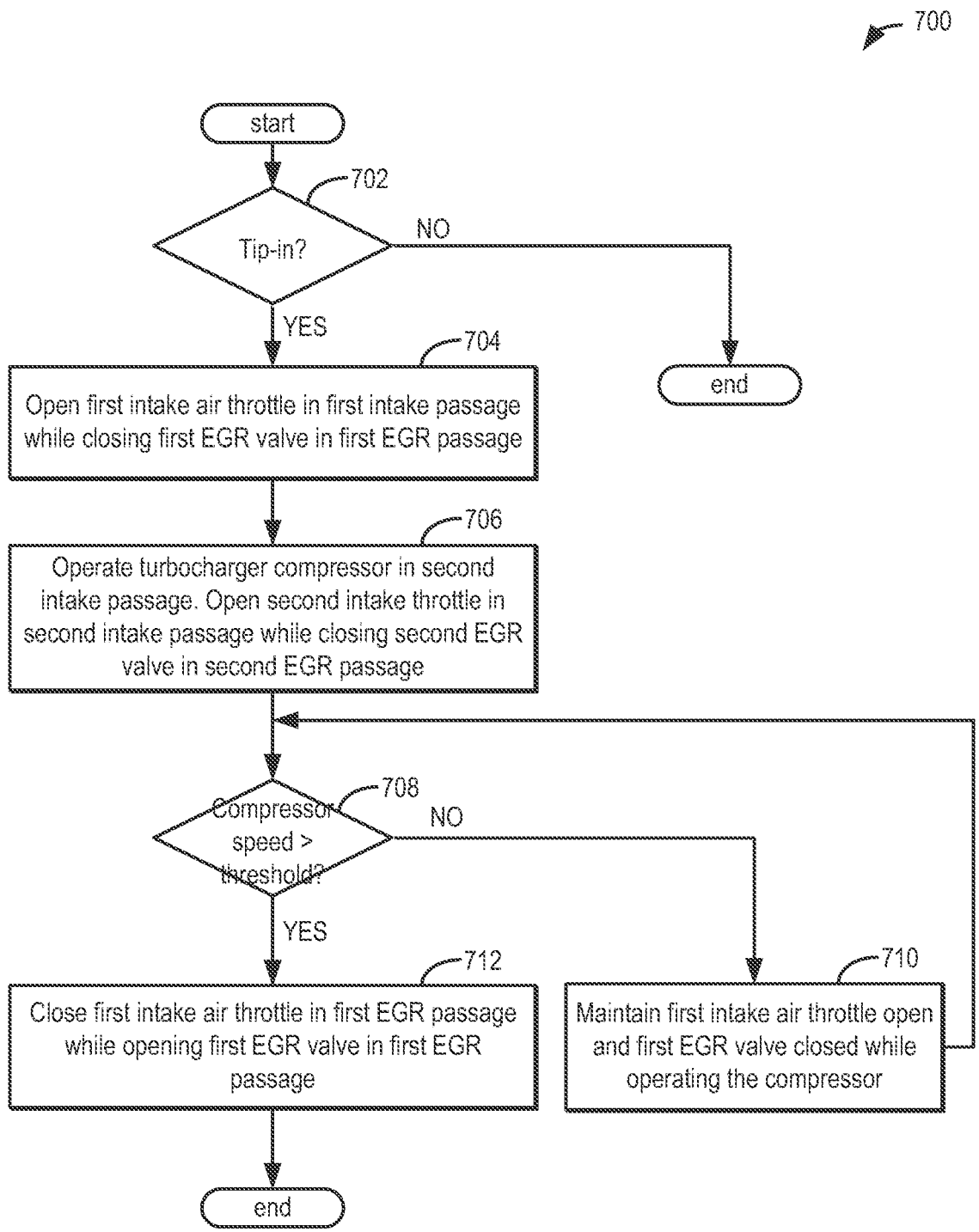
FIG. 7 shows a high level flowchart illustrating a routine that may be implemented for coordinating intake air throttle operation with turbocharger operation during a tip-in event.
Figure 8:
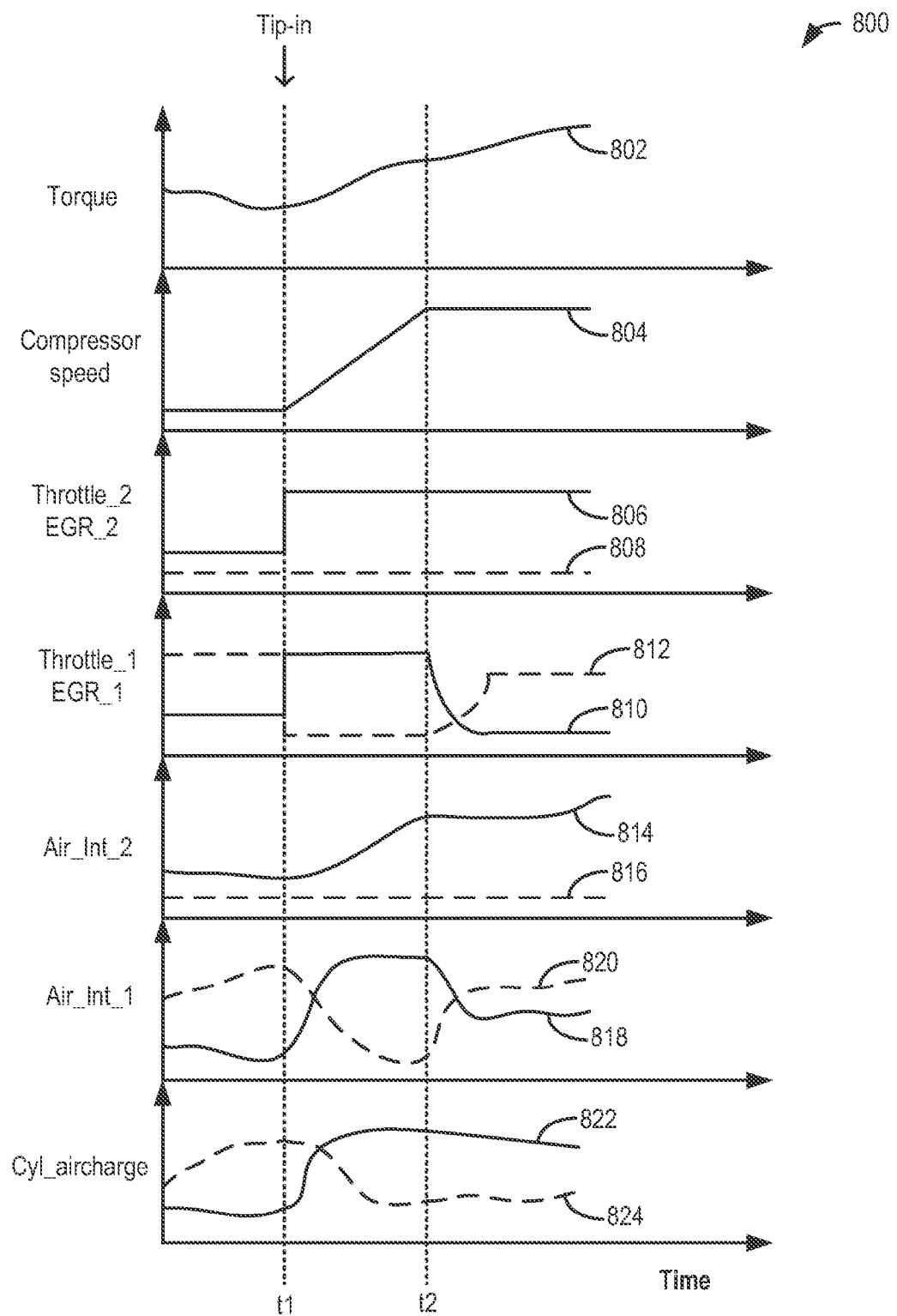

Now turning to FIG. 7, an example routine 700 is described for reducing turbo-lag. Specifically, the routine depicts coordinating the intake air throttle operation of a first intake passage with turbocharger operation in a second intake passage during a tip-in event to reduce turbo-lag. By reducing turbo-lag, turbocharger efficiency can be increased and engine performance can be improved. FIG. 8 illustrates an example throttle-EGR valve adjustment during a tip-in, as per the routine of FIG. 7, by way of map 800.

At 702, the routine includes confirming a tip-in event. In one example, a tip-in event may be confirmed in response to a driver tipping in (or pressing) the accelerator pedal beyond a threshold position. In another example, a tip-in event may be confirmed in response to a driver torque demand being higher than a threshold.

As such, prior to the tip-in event, each engine cylinder may have been receiving an amount of recirculated exhaust gas (specifically, LP-EGR) through a first intake passage while receiving fresh intake air through a second, separate but parallel intake passage. Exhaust gas may have been recirculated at a lower pressure from a first exhaust passage communicatively coupled to the first intake passage, downstream of an first air intake throttle, via a first EGR passage including a first EGR valve. In response to a tip-in event, at 704, the routine includes increasing an amount of fresh intake air while decreasing the amount of recirculated exhaust gas delivered to the cylinder via the first intake passage. Specifically, the routine includes opening (or increasing an opening of) the first air intake throttle in the first intake passage to increase the amount of fresh intake air inducted into the cylinder through the first intake passage, while closing (or decreasing an opening of) the first EGR valve in the first EGR passage coupled between the first intake passage and the first exhaust passage to decrease the amount of exhaust gas recirculated through the first intake passage.

While adjusting the air intake throttle and EGR valve in the first intake passage, at 706, the routine further includes, operating a turbocharger compressor coupled to the second intake passage to increase an amount of boosted fresh intake air delivered to the cylinder via the second intake passage for a duration of the tip-in. Specifically, the engine controller may initiate operation of the turbocharger compressor while opening (or increasing an opening of) a second air intake throttle coupled in the second intake passage, downstream of the compressor, to increase an amount of boosted fresh intake air delivered to the cylinder. The controller may also close (or decrease an opening of) a second EGR valve included in a second EGR passage coupled between the second intake passage and the second exhaust passage to decrease an amount of higher pressure exhaust gas recirculated through the second intake passage. In one example, the first air intake throttle may be gradually opened and the first EGR valve may be gradually closed with a profile based on the compressor's speed profile. The adjustments to the first and second air intake throttles and first and second EGR valves may be continued for a duration corresponding to a duration until the compressor attains a threshold speed. In one example, the threshold speed may correspond to a speed beyond which turbo-lag may be reduced, such as a speed at which the pressure output of the compressor is greater than the atmospheric (or barometric) pressure under the given engine operating conditions.

At 708, it may be confirmed whether the compressor speed has reached the threshold speed. Alternatively, it may be determined if the predetermined duration corresponding to a duration until the compressor attains the threshold speed has elapsed (e.g., using a timer). If not, then at 710, the routine may maintain the first intake air throttle open and the first EGR valve closed while operating the compressor. In comparison, if the compressor speed has reached the threshold speed, or if the predetermined duration has elapsed, then at 712, after the duration has elapsed, the routine includes decreasing the amount of fresh intake air while increasing the amount of recirculated exhaust gas delivered to the cylinder via the first intake passage. Specifically, the routine includes closing (or decreasing an opening of) the first air intake throttle in the first intake passage, to decrease the amount of fresh intake air inducted into the cylinder through the first intake passage, while opening (or increasing an opening of) the first EGR valve in the first EGR passage coupled between the first intake passage and the first exhaust passage to increase the amount of exhaust gas recirculated through the first intake passage. In one example, the first air intake throttle may be gradually closed and the first EGR valve may be gradually opened with a profile based on the engine speed profile.

In this way, the cylinder may be filled with fresh intake air via the first intake passage while the compressor is brought up to speed in the second intake passage so that by the time the compressor is at the desired boost speed, the cylinder may already be filled with fresh intake air. In other words, by the time the compressor is at boost pressure, boosted fresh intake air may be provided to the cylinder via the second intake passage while additional fresh air is provided to the cylinder via the first intake passage. Consequently, turbo-lag caused by waiting for a compressor to come to speed before boosted fresh air can be inducted into the cylinder is reduced. Then, when the compressor has reached the desired speed, EGR can be phased in through the first and second intake passages (specifically, LP-EGR via the first intake passage and HP-EGR via the second intake passage) to provide EGR benefits in addition to boost benefits. By reducing turbo-lag, turbocharger efficiency is improved and engine performance is increased. By providing boost and EGR benefits together, synergistic improvements in engine performance can be achieved.

The steps of FIG. 7 are further clarified by the example of FIG. 8. Map 800 depicts an engine torque output at graph 802 over a duration of engine operation. Corresponding changes in a turbocharger compressor speed are depicted at graph 804. Changes in the position of a first air intake throttle and a first EGR valve coupled to the first air intake passage are shown at graphs 810 and 812, respectively, while changes in the position of a second air intake throttle and a second EGR valve coupled to the second air intake passage are shown at graphs 806 and 808, respectively. As such, only the second intake passage may include the turbocharger compressor. Changes in the composition of a first aircharge (Air_Int_1) delivered to the cylinder through the first intake passage, resulting from adjustments to the first EGR valve and throttle, are shown at graphs 818 and 820 while changes in the composition of a second aircharge (Air_Int_2) delivered to the cylinder through the second intake passage, resulting from adjustments to the second EGR valve and throttle, are shown at graphs 814 and 816. Changes in the net cylinder aircharge (Cyl_aircharge) are shown at graphs 822 and 824, respectively. In each of graph 814-824, the solid line represents a fresh air component of the aircharge while the dashed line represents an EGR component of the aircharge.

Prior to t1, based on engine operating conditions, a lower torque may be demanded. Herein, the net cylinder aircharge corresponding to the lower torque output may include a relatively higher amount of EGR (dashed line of graph 824) and a relatively smaller amount of fresh air (solid line of graph 822). By using EGR during low load conditions, fuel economy and reduced emissions benefits may be achieved. The net cylinder aircharge delivered to the cylinder prior to t1 may be provided by mixing a first intake aircharge delivered along the first intake passage with a second intake aircharge delivered along the second intake passage. Specifically, the first intake aircharge may include a higher amount of recirculated exhaust gas (graph 820) at or below barometric pressure (that is, LP-EGR) and a lower amount of naturally aspirated fresh air (graph 818) provided by opening the first EGR valve (graph 812) and the second intake throttle (graph 810) by corresponding amounts. In comparison, the second intake aircharge may include fresh intake air (solid line of graph 814) and substantially no EGR (dashed line of graph 816)

provided by opening the second intake throttle (graph 806) while closing the second EGR valve (graph 808).

At t1, a tip-in event may occur leading to a higher torque demand. For example, the higher torque output may be demanded in response to a vehicle operator pressing the accelerator pedal to beyond a threshold position. In response to the tip-in event, the compressor (graph 804) may be operated to provide a boosted intake aircharge, while the second intake throttle (graph 806) is opened (e.g., fully opened) to induct boosted fresh air into the cylinder. However, the boosted aircharge may not be available until the compressor reaches a threshold speed leading to a turbo lag. To reduce the turbo lag, while the compressor is spinning up in the second intake passage, the first intake aircharge delivered along the first intake passage may be temporarily adjusted to increase the portion of fresh intake air while reducing the portion of EGR (graphs 808-820). Specifically, the first EGR valve (graph 812) may be closed while the first intake throttle (graph 810) is fully opened to increase the amount of naturally aspirated fresh air inducted into the cylinder while reducing the amount of LP-EGR delivered to the cylinder.

At t2, when the compressor is at or above the desired threshold speed, a boosted fresh intake aircharge may be delivered to the cylinder along the second intake passage (graph 814). At this time, the amount of fresh air delivered along the first intake passage may be decreased by gradually closing the first intake throttle (graph 810), while LP-EGR may be gradually returned by opening the first EGR valve (graph 812). In this way, while the compressor spins up in one intake passage, fresh air can be inducted into the cylinder through the other intake passage to dilute out any EGR already present in the cylinder. Consequently, when the compressor has spun-up, the inducted fresh air in the second intake passage can be compressed to meet the higher torque demand. Further, when the compressor has spun-up, the compressor may be used to induct boosted fresh air through one intake passage while LP-EGR is delivered in parallel to the engine cylinder through the other intake passage. In this way, turbo lag can be reduced while providing EGR benefits alongside boost benefits.

It will be appreciated that in still other embodiments, turbo lag may be additionally or optionally reduced by closing EGR valves, deactivating the first exhaust valve and fully opening second exhaust valve. Then, if EGR is desired, one or more of the EGR valves may be opened to provide the desired EGR, as elaborated above at 808 and 812.

Figure 9:
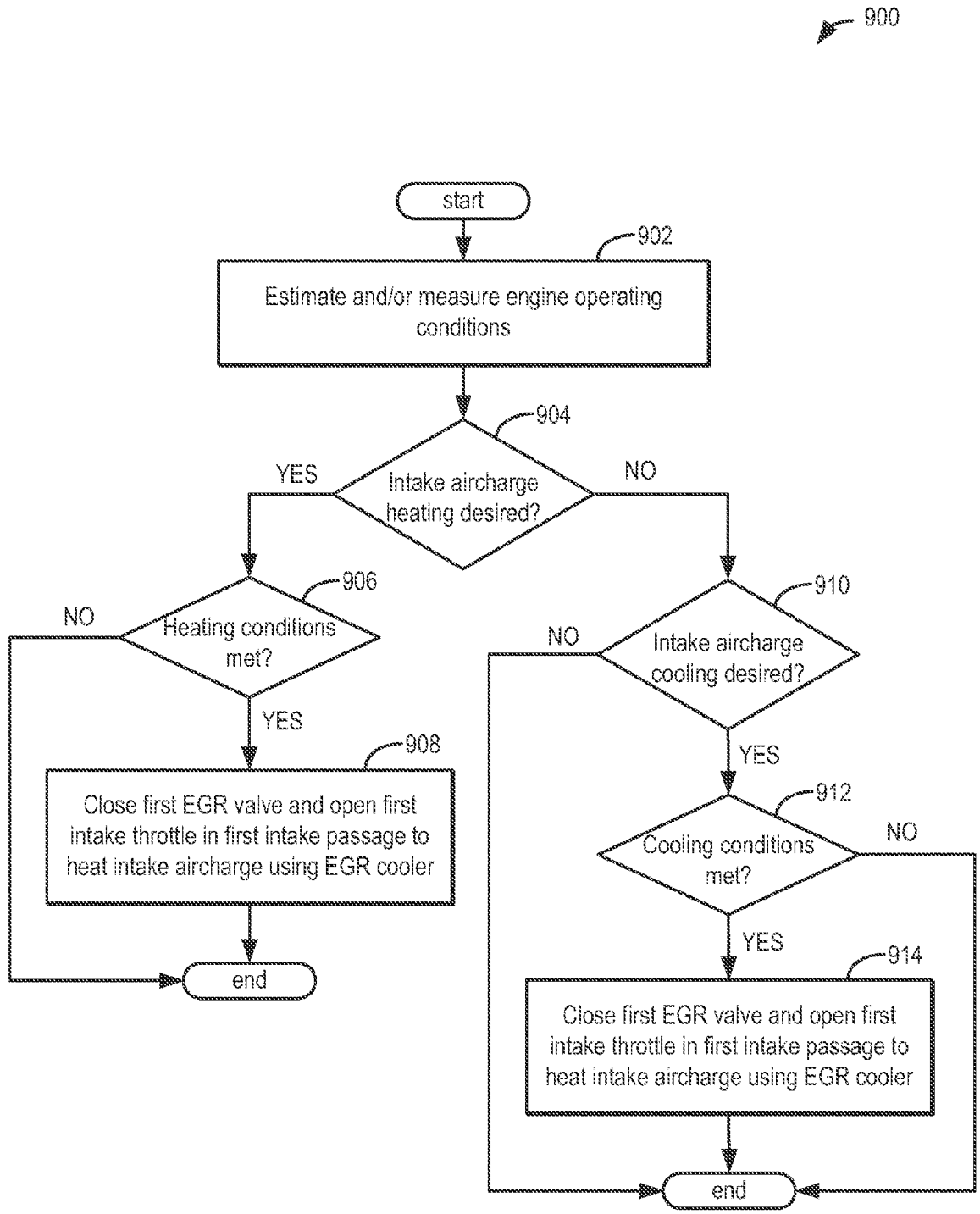
FIG. 9 shows a high level flow chart illustrating a routine that may be implemented for adjusting the operation of an EGR cooler based on engine operating conditions.

Now turning to FIG. 9, an example routine 900 is shown for adjusting the operation of an EGR cooler based on engine operating conditions. Specifically, the routine enables an EGR cooler positioned at the junction of an EGR passage and an intake passage (e.g., at the junction of the first EGR passage and the first intake passage) to be used to cool an intake aircharge delivered to the cylinder (e.g., via the first intake passage) during some conditions while enabling the EGR cooler to heat the intake aircharge during other conditions.

At 902, engine operating conditions may be estimated and/or measured. These may include, for example, ambient temperature and pressure, engine temperature, engine speed, crankshaft speed, transmission speed, battery state of charge, fuels available, fuel alcohol content, catalyst temperature, driver demanded torque, etc. At 904, it may be determined whether intake aircharge heating is desired. In one example, intake aircharge heating may be desired when the engine is not knock-limited. For example, if no knocking is anticipated, the intake aircharge may be heated to lower the engine pumping work and improve fuel economy.

If heating is requested, then at 906, heating conditions may be confirmed. Specifically, it may determined whether all conditions are present for being able to operate the EGR cooler as a heater to heat an intake aircharge. For example, where the EGR cooler is a liquid coolant based cooler, it may be confirmed that the coolant temperature is higher than the intake air temperature. Further, it may be confirmed that knocking conditions are not present (that is, knock is not occurring or anticipated). If all the heating conditions are met, then at 908, the routine includes closing the first EGR valve while opening the first intake throttle in the first intake passage to heat the intake aircharge inducted into the cylinder along the first intake passage using the first EGR cooler. In this way, the intake aircharge delivered along the first intake passage can be heated before being inducted into the cylinder, thereby reducing engine pumping losses and improving engine efficiency. As such, if any or all of the heating conditions are not met, then the controller may determine that the EGR cooler cannot be operated as an aircharge heater at this time, and the routine may end.

If intake aircharge heating is not required at 904, then at 910 it may be determined whether intake aircharge cooling is required. In one example, cooling may be used to reduce the temperature of EGR being delivered to the cylinder. The cooled EGR may reduce cylinder knock while also providing fuel economy and NOx reduction benefits. If no cooling is desired, the routine may end. If cooling is desired, then at 912, cooling conditions may be confirmed. Specifically, it may be determined whether all the conditions are present for being able to operate the EGR cooler to cool an intake aircharge. For example, it may be confirmed that the cooling will not lead to condensation on the compressor. If all the cooling conditions are met, then at 914, the routine includes opening the second EGR valve while closing the second intake throttle in the second intake passage to cool the EGR in the intake aircharge inducted into the cylinder along the second intake passage using the second EGR cooler. Additionally, or optionally, the routine may include opening the first EGR valve while closing the first intake throttle in the first intake passage to cool the EGR in the intake aircharge inducted into the cylinder along the first intake passage using the first EGR cooler. In this way, the intake aircharge can be cooled before being inducted into the cylinder, and temperature control of EGR may be achieved. As such, if any or all of the cooling conditions are not met, then the controller may determine that the EGR cooler cannot be operated as an aircharge cooler at this time, and the routine may end.

In one example, intake aircharge heating may include heating only the EGR delivered to the cylinder. For example, when the EGR cooler is positioned within the recirculation passage (or EGR passage), as depicted in FIGS. 1-2, the EGR valve may be opened and the EGR cooler may be operated as a heater to heat the EGR and mix the heated EGR with cooler fresh intake air in the intake passage before delivery to the cylinder. Alternatively, if the EGR cooler is positioned at the junction of the EGR passage and the intake passage, intake aircharge heating may include heating the fresh intake air and/or the EGR delivered to the cylinder. For example, the EGR valve may be closed while the EGR cooler is operated as a heater to heat the fresh intake air before delivery to the cylinder. Alternatively, the EGR valve may be opened and the EGR cooler may be operated as a heater to heat the fresh air and the EGR, the heated EGR and heated fresh air being mixed in the intake passage prior to delivery to the cylinder.

In still other examples, one of the EGR coolers may be operated as a cooler while the other EGR cooler is operated as a heater. For example, during a first condition, an engine controller may operate the first EGR cooler in the first intake passage to heat a first amount of exhaust gas before recirculating the exhaust gas to the first intake passage, and during a second condition, the controller may operate the first EGR cooler in the first intake passage to cool the first amount of exhaust gas before recirculating the exhaust gas to the first intake passage. At the same time, during the first condition, the engine controller may operate a second EGR cooler in the second intake passage to cool a second amount of exhaust gas before recirculating the exhaust gas to the second intake passage, while during the second condition, the controller may operate the second EGR cooler in the second intake passage to heat the second amount of exhaust gas before recirculating the exhaust gas to the second intake passage. As such, the second EGR cooler may be used as a heater only when the compressor is not operating and no boost in being provided.

Further still, operation of the EGR coolers may be coordinated with the operation of a charge air cooler positioned downstream of a turbocharger compressor (such as charge air cooler 56 of FIGS. 1-2). For example, the first EGR cooler in the first intake passage may be used as a heater to provide a heated intake aircharge (including fresh intake air and/or LP-EGR) to the cylinder via the first intake passage. At the same time, the compressor in the second intake passage may be operated to provide a boosted intake aircharge while the charge air cooler downstream of the compressor is operated to cool the boosted intake aircharge. In this way, heated naturally aspirated air (at or below atmospheric pressure) and cooled boosted air can be provided to the cylinder simultaneously. The heated and cooled aircharges can then be mixed and combusted in the cylinder. Herein, by combining and combusting heated and cooled aircharges delivered separately but simultaneously to a cylinder, a substantially constant compression temperature may be achieved over varying loads, improving engine performance.

In this way, a split engine intake may be combined with a split engine exhaust to deliver different aircharges of differing composition and pressure to a cylinder at different timings. Specifically, a naturally aspirated aircharge may be inducted separate from a boosted aircharge to reduce the amount of compression work required. By reducing the amount of work required by the compressor, an engine boosting efficiency can be increased, even with the use of a smaller turbocharger. In another embodiment, EGR may be delivered separate from a boosted fresh intake aircharge. By keeping EGR out of the compressor, fouling and contamination of the compressor can be reduced while enabling EGR control delays and turbocharger control delays to be reduced. In another embodiment, HP-EGR and LP-EGR may be delivered via separate passages. Herein, overall EGR control can be improved while allowing the EGR benefits to be extended over a wider range of conditions. Additionally, over-dilution of air with EGR, in particular, when switching from a high cylinder air charge to a low cylinder aircharge, can be reduced by enabling a second path of non-dilute air to be provided. Overall, EGR and boost efficiency can be improved to increase engine performance.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of operating an engine, comprising:
providing a first aircharge at or below barometric pressure to an engine cylinder through a first intake passage; while
providing a second, boosted aircharge to the same cylinder through a second, separate intake passage, the second aircharge boosted via an intake compressor driven by an exhaust turbine.

2. The method of claim 1, wherein providing the first aircharge at or below barometric pressure to the engine cylinder through the first intake passage includes providing the first aircharge at or below barometric pressure to the cylinder through the first intake passage that is coupled to a first exhaust passage and wherein providing the second, boosted aircharge to the cylinder through the second, separate intake passage includes providing the second, boosted aircharge to the cylinder through the second intake passage that is coupled to a second exhaust passage, the intake compressor included in the second intake passage, the exhaust turbine included in the second exhaust passage.

3. The method of claim 2, further comprising, mixing the first and second aircharges with fuel in the cylinder and combusting the mixture in the cylinder.

4. The method of claim 2, wherein providing the second, boosted aircharge to the cylinder through the second, separate intake passage includes providing the second, boosted aircharge to the cylinder through the second intake passage that is parallel to the first intake passage, and wherein the second exhaust passage is parallel to the first exhaust passage.

5. The method of claim 1, wherein providing at least some aircharge at or below barometric pressure includes opening a first intake valve in the first intake passage at a first intake valve timing, and wherein providing at least some boosted aircharge includes opening a second intake valve in the second intake passage at a second, different intake valve timing, in the same engine cycle.

6. The method of claim 5, wherein opening the first intake valve in the first intake passage at the first intake valve timing includes opening the first intake valve in the first intake passage at the first intake valve timing that is adjusted relative to the second intake valve timing based on engine operating conditions.

7. The method of claim 5, further comprising, operating an intake valve actuator coupled to the first and second intake valves with a phase difference to open the first valve at the first timing and open the second valve at the second timing.

8. The method of claim 1, wherein providing the first aircharge at or below barometric pressure to the cylinder through the first intake passage includes providing the first aircharge that includes a first amount of fresh intake air at or below barometric pressure, and wherein providing the second, boosted aircharge to the cylinder through the second, separate intake passage includes providing the second aircharge that includes a second amount of fresh intake air at boost pressure.

9. The method of claim 8, wherein providing the first aircharge at or below barometric pressure to the cylinder through the first intake passage includes providing the first aircharge that includes a mixture of the first amount of fresh intake air with a first amount of recirculated exhaust gas at or below barometric pressure, and wherein providing the second, boosted aircharge to the cylinder through the second, separate intake passage includes providing the second aircharge that includes a mixture of the second amount of fresh intake air with a second amount of recirculated exhaust gas at a boost pressure.

10. A method of operating an engine, comprising:
delivering a first aircharge including a first amount of recirculated exhaust gas and a first amount of fresh intake air below barometric pressure to an engine cylinder via a first intake passage; and
delivering a second aircharge including a second amount of recirculated exhaust gas and a second amount of fresh intake air at compressor pressure to the engine cylinder via a second, separate intake passage.

11. The method of claim 10, further comprising:
direct injecting fuel into the cylinder;
mixing the first aircharge with the second aircharge and the injected fuel in the cylinder; and
combusting the mixture in the cylinder.

12. The method of claim 10, wherein delivering the first aircharge includes opening a first intake valve of the first intake passage at a first intake valve timing, and wherein delivering the second aircharge includes opening a second intake valve of the second intake passage at a second intake valve timing.

13. The method of claim 12, wherein delivering the first aircharge further includes opening a first EGR valve to recirculate the first amount of exhaust gas from a first exhaust passage to the first intake passage, and wherein delivering the second aircharge further includes opening a second EGR valve to recirculate the second amount of exhaust gas from a second, separate exhaust passage to the second intake passage.

14. The method of claim 13, wherein delivering the second aircharge at compressor pressure further includes operating a compressor included in the second intake passage, the compressor driven by a turbine included in the second exhaust passage, and wherein the second amount of exhaust gas is recirculated from upstream of the turbine to downstream of the compressor.

15. The method of claim 14, wherein the first intake valve and the second intake valve are coupled to a valve actuator, further comprising, adjusting a valve phase of the valve actuator to open the first valve at the first intake valve timing and the second valve at the second intake valve timing, the first intake valve timing being earlier in an intake stroke of an engine cycle than the second intake valve timing.

16. The method of claim 15, wherein delivering the first aircharge further includes opening a first exhaust valve of the first exhaust passage at a first timing and opening a second exhaust valve of the second exhaust passage at a second, earlier timing.

17. An engine system, comprising:
an engine cylinder;
a first intake passage communicating uncompressed aircharge to an engine cylinder via a first intake valve;
a second intake passage communicating compressed aircharge to the cylinder via a second intake valve;
a turbocharger compressor coupled to the first intake passage configured to compress an aircharge delivered to the cylinder;
a valve actuator for opening the first intake valve and the second intake valve; and
a control system with computer readable instructions stored on a non-transitory computer readable medium for:
adjusting a phase of the valve actuator to open the first intake valve at a first timing and the second intake valve at a second, different timing, wherein the uncompressed aircharge includes at least some fresh air and at least some EGR at or below barometric pressure, and wherein the compressed aircharge includes at least some fresh air and at least some EGR at compressor pressure.

18. The system of claim 17, wherein the first intake passage is parallel to, and separate from the second intake passage, the system further comprising, a first and second exhaust passage, the first exhaust passage parallel to, and separate from the second exhaust passage, and a turbocharger turbine coupled to the second exhaust passage, the turbine configured to drive the compressor.

19. The system of claim 18, further comprising,
a first EGR passage communicatively coupling the first exhaust passage to the first intake passage, the first EGR passage including a first EGR cooler and a first EGR valve; and
a second EGR passage communicatively coupling the second exhaust passage to the second intake passage, the second EGR passage including a second EGR cooler and a second EGR valve, wherein
the control system includes further instructions for opening the first EGR valve to deliver the at least some EGR at or below atmospheric pressure to the first intake passage and open the second EGR valve to deliver the at least some EGR at compressor pressure from the second exhaust passage, upstream of the turbine, to the second intake passage, downstream of the compressor.

* * * * *